US011026125B2

(12) United States Patent
Hassan et al.

(10) Patent No.: US 11,026,125 B2
(45) Date of Patent: **\*Jun. 1, 2021**

(54) SPECTRUM SHARING WITH SWITCHING OF TIER LEVELS BETWEEN NETWORKS AND/OR DEVICES

(71) Applicant: MICROSOFT TECHNOLOGY LICENSING, LLC, Redmond, WA (US)

(72) Inventors: Amer A. Hassan, Kirkland, WA (US); Paul W. Mitchell, Seattle, WA (US)

(73) Assignee: Microsoft Technology Licensing, LLC, Redmond, WA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/525,484

(22) Filed: Jul. 29, 2019

(65) Prior Publication Data

US 2019/0357087 A1  Nov. 21, 2019

Related U.S. Application Data

(63) Continuation of application No. 15/693,132, filed on Aug. 31, 2017, now Pat. No. 10,383,006.

(51) Int. Cl.
| | |
|---|---|
| *H04W 4/00* | (2018.01) |
| *H04W 72/00* | (2009.01) |
| *H04W 28/24* | (2009.01) |
| *H04W 16/14* | (2009.01) |
| *H04W 72/08* | (2009.01) |
| *H04W 72/04* | (2009.01) |

(Continued)

(52) U.S. Cl.
CPC .......... *H04W 28/24* (2013.01); *H04W 16/14* (2013.01); *H04W 72/08* (2013.01); *H04W 28/26* (2013.01); *H04W 72/0453* (2013.01); *H04W 72/12* (2013.01)

(58) Field of Classification Search
None
See application file for complete search history.

(56) References Cited

U.S. PATENT DOCUMENTS

| | | | | |
|---|---|---|---|---|
| 5,507,008 | A  * | 4/1996 | Kanai | .................. H04W 16/04 |
| | | | | 455/512 |
| 10,383,006 | B2 * | 8/2019 | Hassan | ................. H04W 28/24 |

(Continued)

OTHER PUBLICATIONS

"Non-Final Office Action Issued in U.S. Appl. No. 16/525,498", dated Apr. 13, 2020, 8 Pages.

*Primary Examiner* — Erika A Washington
(74) *Attorney, Agent, or Firm* — NovoTechIP International PLLC

(57) ABSTRACT

In a device including a processor and a memory in communication with the processor, the memory includes executable instructions that, when executed by the processor, cause the processor to control the device to perform functions of connecting a remote device to a network via a first channel associated with a first tier level; determining that a tier level switch condition is met; sending, to a controller of the network, a request for tier level switch from the first tier level to a second tier level; receiving, from the controller of the network, an authorization for switching from the first tier level to the second tier level; and connecting the remote device to the network via a second channel associated with the second tier level.

20 Claims, 9 Drawing Sheets

(51) Int. Cl.
*H04W 28/26* (2009.01)
*H04W 72/12* (2009.01)

(56) References Cited

U.S. PATENT DOCUMENTS

| | | | |
|---|---|---|---|
| 2015/0257007 A1* | 9/2015 | Solondz | H04W 12/08 |
| | | | 713/154 |
| 2015/0373554 A1* | 12/2015 | Freda | H04L 5/0064 |
| | | | 455/450 |
| 2017/0188241 A1* | 6/2017 | Mueck | H04W 16/14 |
| 2017/0318470 A1* | 11/2017 | Srikanteswara | H04W 52/242 |
| 2018/0049036 A1* | 2/2018 | Sethi | H04W 36/0055 |
| 2019/0357088 A1* | 11/2019 | Hassan | H04W 28/24 |

* cited by examiner

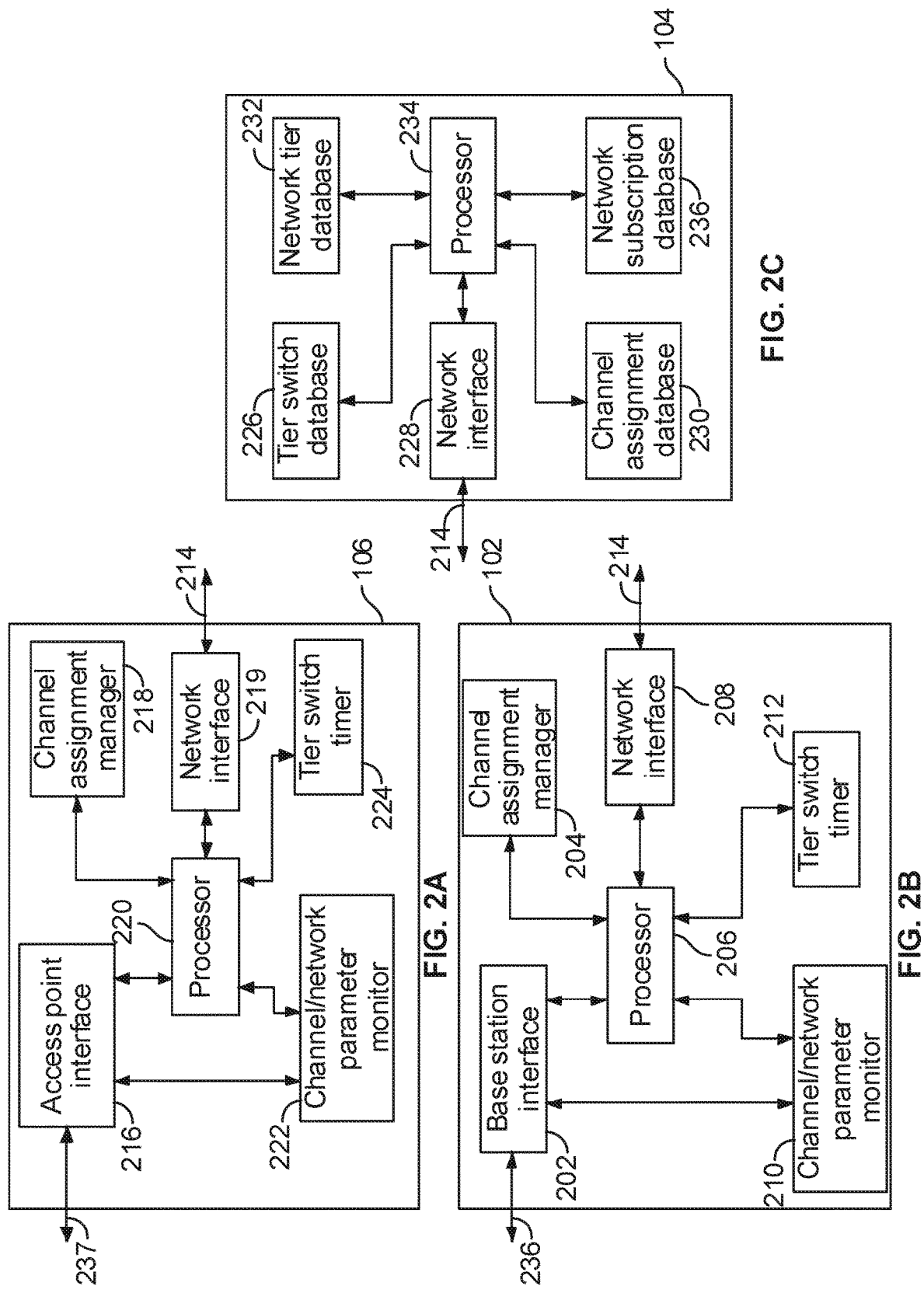

SPECTRUM SHARING WITH SWITCHING OF TIER LEVELS BETWEEN NETWORKS AND/OR DEVICES

CROSS-REFERENCE TO RELATED APPLICATIONS

This application is a continuation of U.S. patent application Ser. No. 15/693,132, filed on Aug. 31, 2017 and issued on Aug. 13, 2019 as U.S. Pat. No. 10,383,006, which is incorporated hereto in its entirety.

BACKGROUND

Various types of wireless networks that utilize channels in frequency spectrum that is shared with other networks have been proposed. The sharing of frequency spectrum allows a wireless network to increase system bandwidth efficiency when channels in the shared frequency spectrum are available for use by the wireless network. In various configurations of these networks, the shared frequency spectrum may be spectrum in unlicensed frequency bands or spectrum in licensed or allocated frequency bands that are shared between licensed networks, for example, on a prioritization basis. The prioritization may be implemented on a tier level basis, in which different levels of priority for use of the frequency spectrum are assigned to different networks. These networks may include networks configured for use with different market segments. For example, the networks that share frequency spectrum may each be configured for Department of Defense (DOD) users, police department users, or cellular users. The networks may also be configured for the same market segment. For example, the networks that share frequency spectrum may each be configured as a corporate network.

An example of networks utilizing shared frequency spectrum is illustrated by a Dynamic Spectrum Access (DSA) system that includes multiple base stations/networks that operate independent of one another to share an allocated frequency spectrum. A DSA system typically includes an incumbent frequency spectrum user that has highest priority for spectrum access. A DSA system is typically configured so that the base stations/networks within the DSA system use channels in a frequency spectrum that is shared with other base stations/networks of the DSA system. The sharing of the frequency spectrum in the DSA system may be done under the coordination of a controller that manages a channel assignment database. Various groups in the wireless industry are currently working to standardize operating rules for DSA systems that have multiple tier levels of priority for spectrum access. In these systems, each base station/network in the DSA system may be assigned one of the multiple tier levels of priority. A DSA database system enabling multiple tier levels of priority is commonly known as a spectrum access system (SAS).

SUMMARY

In an implementation, a device includes a processor and a memory in communication with the processor. The memory includes executable instructions that, when executed by the processor, cause the processor to control the device to perform functions of connecting a remote device to a network via a first channel associated with a first tier level; determining that a tier level switch condition is met; sending, to a controller of the network, a request for tier level switch from the first tier level to a second tier level; receiving, from the controller of the network, an authorization for switching from the first tier level to the second tier level; and connecting the remote device to the network via a second channel associated with the second tier level.

In another implementation, a method for operating a device includes connecting a remote device to a network via a first channel associated with a first tier level; determining that a tier level switch condition is met; sending, to a controller of the network, a request for tier level switch from the first tier level to a second tier level; receiving, from the controller of the network, an authorization for switching from the first tier level to the second tier level; and connecting the remote device to the network via a second channel associated with the second tier level.

In another implementation, a non-transitory computer readable medium containing instructions which, when executed by a processor, cause a device to perform functions of connecting a remote device to a network via a first channel associated with a first tier level; determining that a tier level switch condition is met; sending, to a controller of the network, a request for tier level switch from the first tier level to a second tier level; receiving, from the controller of the network, an authorization for switching from the first tier level to the second tier level; and connecting the remote device to the network via a second channel associated with the second tier level.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A-2C are diagrams illustrating portions of example controllers in a spectrum access system;

DETAILED DESCRIPTION

Figure 1:
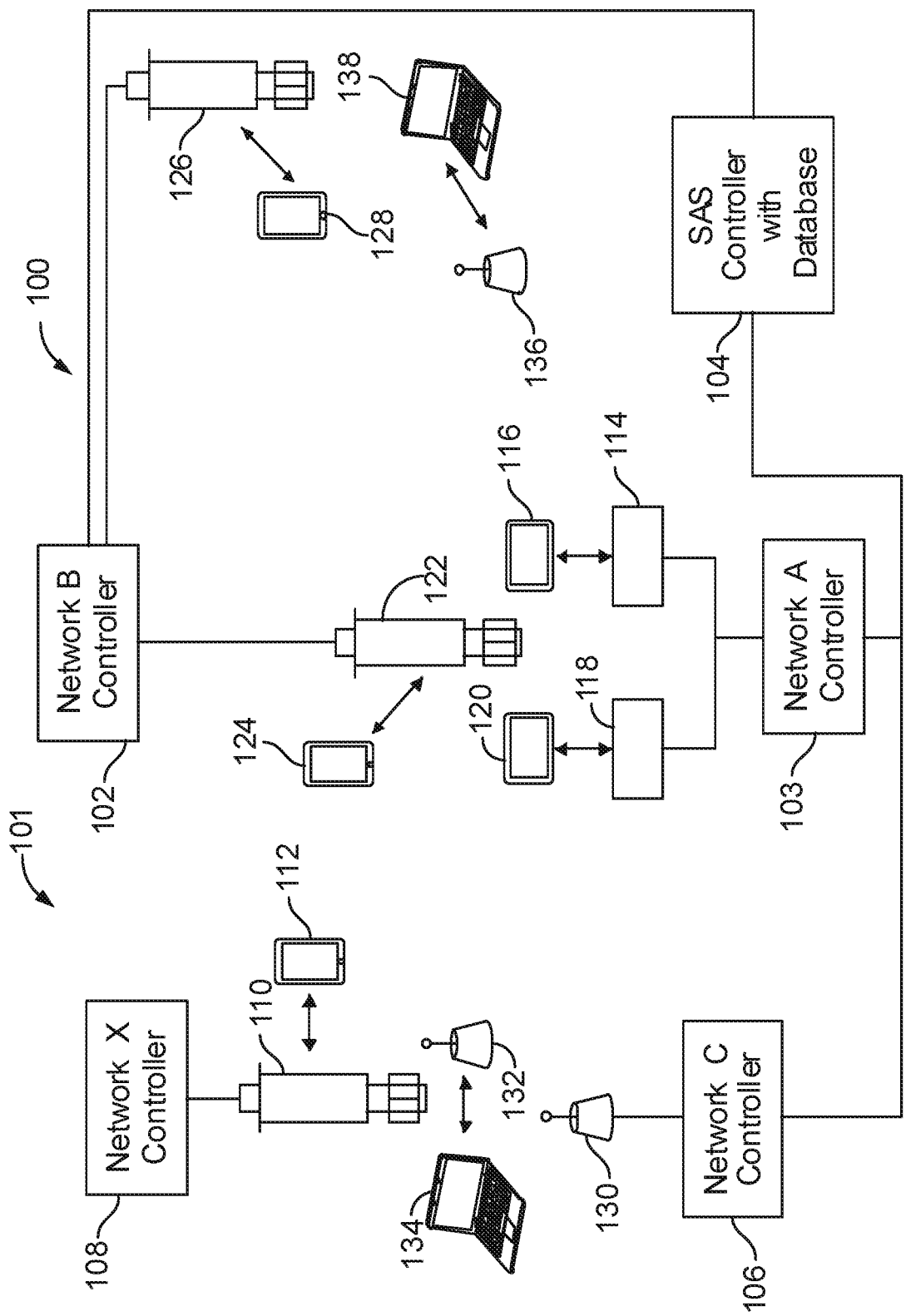
FIG. 1 is a diagram illustrating an example spectrum access system including networks having devices configured to operate according to an implementation.

The system, method and apparatus will now be described by use of example embodiments. The example embodiments are presented in this disclosure for illustrative purposes, and not intended to be restrictive or limiting on the scope of the disclosure or the claims presented herein.

The methods, systems, and apparatus of the embodiments provide tier level switching between or within networks/devices in a spectrum access system (SAS) in which the networks/devices are assigned tier levels that indicate priority for spectrum access. An SAS of this type may be a multi-tier level system, for example, a 3-tier level priority system that includes spectrum users (networks and/or devices) that are each assigned one of three priority levels for use of channels within the shared spectrum. As used in this disclosure, the term channel means a portion or a band of frequency spectrum within which a network/device may transmit and/or receive signals. For example, a channel assignment to a network/device may comprise the assignment of one or more portions or bands of frequency spectrum within which the network/device may transmit and receive signals. The network/device may transmit and receive using any technology on frequency channels within the one or more portions or bands of frequency spectrum. In some implementations, the channel assignment may include channel numbers defined by a particular wireless standard.

The three priority levels of a SAS 3-tier level system may include a tier-1 level that includes incumbent spectrum users, a tier-2 level that includes spectrum users who are each licensed to use a certain portion of spectrum, and a tier-3 level that includes spectrum users who are general allowed access (GAA) users. In the 3-tier level system, when a tier-1 level user is active on a channel x, proximity tier-2 level and tier-3 level users cannot use the same channel x. In the absence of an active tier-1 level user on a channel x, a tier-2 level user can use the channel x. In the case where a tier-2 level user is using channel x, a tier-3 level user cannot use channel x. A tier-3 level user can only use channel x if there are no active tier-1 level or tier-2 level users on channel x.

Spectrum access management in a 3-tier level SAS is accomplished by using a SAS controller to manage an SAS channel assignment database. In a 3-tier level SAS, since tier-1 level devices are the incumbents and have highest priority in the spectrum for which they are incumbent, a tier-1 level user does not need to request a channel assignment from the controller of the SAS channel assignment database. The tier-1 level users may use the spectrum for which they are incumbent based on their own decisions, independently of the controller. Tier-1 level users may or may not inform (register with) the controller of the SAS channel assignment database to inform the SAS controller of the channels being used by the tier-1 level users. Whether or not a tier-1 level user informs the controller of its channel use depends on the system configuration. For example, if a tier-1 level user is a department of defense (DOD) or Military related entity, the tier-1 level user may not want to inform the controller of its channel usage for security reasons. In other cases, a spectrum access system operator may have agreements with tier-1 level users that the tier-1 level users will register their channel usage with the controller. In these cases, the registration of channel usage by tier-1 level users may allow the SAS controller to more efficiently manage channel assignments to tier-2 level and tier-3 level users.

In a 3-tier level SAS, tier-2 level and tier-3 level users send database queries to request channel assignments from the SAS controller in order to use spectrum in the SAS. The database queries allow the SAS controller to register the tier-2 level and tier-3 level users in an SAS database in order to manage and coordinate the spectrum usage according to a set of rules that avoids channel conflicts and interference.

Implementations of this disclosure provide technical advantages in systems such as a multi-tier level SAS by allowing the networks or devices operating in the multi-tier level SAS to switch tier levels. In an implementation, the switching of tier levels may be a swap of tier levels between a network/device and another network/device. In this case, the tier level of a network/device is switched or swapped with the tier level of another network/device and each network device operates at the tier level of the other network/device after the tier switch. In another implementation, the switching of tier levels may be a switching of tier levels used by a single network or a single device without any swap occurring with another network or device. In this case, the tier level of a network or device may be switched to another tier level for operation in the SAS.

In one example, an implementation provides advantages in a SAS by allowing a first network having low priority tier level to temporarily switch tier levels with a second network having a high priority tier level. The tier level switch may take place during a time period when the channel quality and/or bandwidth provided to the first network at the low priority level is degraded and the second network is not fully utilizing, or doesn't require, the channel quality and/or bandwidth available to the second network at the high priority level. In this case, the tier switch allows the first network to utilize the higher channel quality and/or bandwidth available at the high priority level when the higher channel quality and/or bandwidth are not needed by the second network.

In another example, an implementation provides advantages by allowing a network to self-initiate the switching of tier levels at which the network operates based on channel quality and/or bandwidth in the network and a cost function that indicates a cost of switching tier levels. The cost may be additional charges incurred by the network to operate at a higher tier level. When channel quality and/or bandwidth need improvement and the cost function indicates the cost is acceptable, the network may inform the spectrum access system that the network is switching tier levels and initiate operation at the higher tier level. The tier switch allows the network to utilize the higher channel quality and/or bandwidth available at the higher priority level. In this case, the tier switch may allow a network to operate in a spectrum access system while trading off the lower cost of operating at a low tier level with the higher cost of operating at the higher tier level for better quality service.

In a further example, another implementation provides advantages by allowing a first network operating at the first tier level and having available spectrum at the first tier level that is not being utilized to share the available spectrum with one or more second networks. In this example, a network controller in the first network having the available spectrum may provide information on the available spectrum to a SAS controller of a spectrum access system. The SAS controller may then broadcast the information to one or more second networks of the spectrum access system and coordinate a tier switch between the first network and a selected network of the one or more second networks. The tier switch allows the selected network to utilize the excess spectrum of the first network at the first tier level. The coordination of the tier switch by the network controller may involve determining that the selected network meets a condition of use included in the information provided by the first network. In an example, the conditions of use may include a cost condition and the coordination of the tier switch may include determining that the selected network of the one or more second networks meets the cost condition. In an example, the selected network may meet the cost condition by responding to the controller with a highest proposed payment or bid to be credited to the first network for use of the first tier level spectrum as compared to proposed payments received from other networks. In another example, the selected network may meet the cost condition by agreeing to a set payment of a cost set out in the cost condition. The payment may be credited an account associated with the first network by the SAS controller.

The implementations have applicability to systems such as Wi-Fi systems or long term evolution-unlicensed (LTE-U) systems, systems utilizing frequency spectrum in the television white space (TVWS), dynamic spectrum access (DSA) systems, and any other systems in which frequency spectrum is shared based on assignment of tier levels for priority of access to spectrum.

FIG. 1 shows a spectrum access system 100 that includes three networks. Network A includes devices 114, 116, 118, and 120, and network A controller 103. Network B includes devices 122, 124, 126, and 128, and network B controller 102. Network C includes devices 132 and 134, and network C controller 106 that includes high power access point 130. Devices 122 and 126 may be base stations configured as cellular base stations and devices 124 and 128 may be mobile handsets or similar devices operating in a cellular network comprising network B. Devices 114 and 118 may be base stations configured as wireless access nodes (functioning as base stations or access points) for a private/public service network comprising network A, and devices 116 and 120 may be tablet computers or similar devices operating in the private/public service network A. Device 132 may be a base station configured as a Wi-Fi access point of a business/organizational local area network (LAN) comprising network C, and device 134 may be a laptop computer or similar device operating in the LAN network. FIG. 1 also shows system 101 that includes network X controller 108, base station 110 and mobile handset 112. System 101 may be located remotely from networks A, B, and C and may be a spectrum access system that is different from, and independent of, spectrum access system 100. Network A controller 103, network B controller 102, and network C controller 106 are each shown communicating with a SAS controller 104 of spectrum access system 100. SAS controller 104 includes a spectrum access system (SAS) database. While devices 116, 120, 124, 128, and 134 are shown as particular types of mobile devices, in other implementations each of these devices may be configured as any other type of wireless device, such as a mobile phone, a laptop, a tablet device, a gaming/media device, a personal computer, or any other type of wireless device. Also, while devices 114, 118, 122, 126, and 132 are shown as particular types of base stations, in other implementations each of these devices may be implemented as any other type of base station, access point, transmitter station, or other type of apparatus/device that provides a communications interface between a network and a wireless device.

Networks A, B, and C of spectrum access system 100 may each be assigned to a tier level of 3 available tier levels of spectrum access system 100. In an implementation, devices (nodes) 114 and 118 of network A may be assigned to tier-1 level (highest priority), devices (base stations) 122 and 126 of network B may be assigned to tier-2 level (medium priority), and device (access point) 132 of network C may be assigned to tier-3 level (lowest priority). Tier-1 users/networks may be in the category of high priority users such as radar systems and Department of Defense (DoD) users. Tier-2 users/networks may be in the category of intermediate priority users such as police departments, fire departments, or licensed cellular systems. Tier-3 users/networks may be in the category of other users with general allowed access. For example, tier-3 users may be local access networks (LANs) of businesses or other organizations.

In the 3-tier spectrum access system 100, when a tier-1 user (network or base station) is active on a channel x, proximity tier-2 and tier-3 users cannot use the same channel x. In the absence of an active tier-1 user on a channel x, a tier-2 user can use the channel x. In this case, a tier-3 channel cannot use channel x. A tier-3 user can only use channel x if there are no active tier-1 and tier-2 users on channel x. The overall management of spectrum access system 100 according to these rules is performed by SAS controller 104.

In an implementation of spectrum access system 100, each of the tier-2 level and tier-3 level network controllers may send queries for channel assignment on behalf of the devices in their network and allocate the assigned channels to the individual devices in the network. For example, network B controller 102 may send a query to SAS controller 104 for channel assignments for network B. When SAS controller 104 responds with channel assignments based on network B having a tier-2 level priority and the location of network B, network B controller may then allocate the channels assigned to network B to the individual base stations 122 and 126. Network C controller 106 may send a query to SAS controller 104 for channel assignments for network C. When SAS controller 104 responds with channel assignments based on network C having a tier-3 level priority and the location of network C, network C controller may then allocate the channels assigned to network C to the access point 132.

In another implementation of FIG. 1, each of the tier-2 level base stations 122 and 126 of network B may be implemented to send a query for a channel assignment to SAS controller 104 through network B controller 102. SAS controller 104 responds to the query by sending a channel assignment of one or more channels directly to each base station 122 and 126 based on Network B having tier-2 level priority and the locations of base stations 122 and 126. Also, tier-3 level access point 132 of network C may send a query for a channel assignment to SAS controller 104 through high power access point 130 and network C controller 106. SAS controller 104 responds to the query by sending a channel assignment of one or more channels directly to access point 132 based on network C having tier-3 level priority and on the location of access point 132.

Access nodes 114 and 118 of network A are tier-1 level devices that have a highest priority for use of designated spectrum that is within the spectrum usable in spectrum access system 100. Access nodes 114 and 118 may use the designated spectrum for communication with tablet computing devices 116 and 120 without permission or assignment from SAS controller 104. In the implementation of FIG. 1, access nodes 114 and 118 may send information through network A controller 103 to SAS controller 104 that informs SAS controller 104 of channels that are being used in network A. SAS controller 104 may then use the information received from nodes 114 and 118 when assigning channels to tier-2 and tier-3 level devices in network B and network C.

FIGS. 2A-2C are diagrams illustrating portions of example controllers in a shared frequency spectrum system. FIG. 2A shows functional portions of network C controller 106 of FIG. 1. Network C controller 106 may include processor 220, access point interface 216, network interface 219, channel/network parameter monitor 222, channel assignment manager 218, and tier switch timer 224. Access point interface 216 may include high power access point/transceiver 130 that allows network C controller 106 to communicate with access point 132 over a wireless interface. FIG. 2B shows functional portions of network B controller 102 of FIG. 1. Network B controller 102 may include processor 206, base station interface 202, network interface 208, channel/network parameter monitor 210, channel assignment manager 204, and tier switch timer 212. FIG. 2C shows functional portions of SAS controller 104 of FIG. 1. SAS controller 104 may include processor 234, network interface 228, channel assignment database 230, network subscription database 236, network tier database 232, and tier switch manager/database 226. The operations of the portions of network A controller 103, network B controller 102, and SAS controller 104 in various implementations of FIG. 1 may be explained in relation to the flow diagrams of FIGS. 3A-3C, FIG. 4, and FIGS. 5A-5B.

Figure 3A:
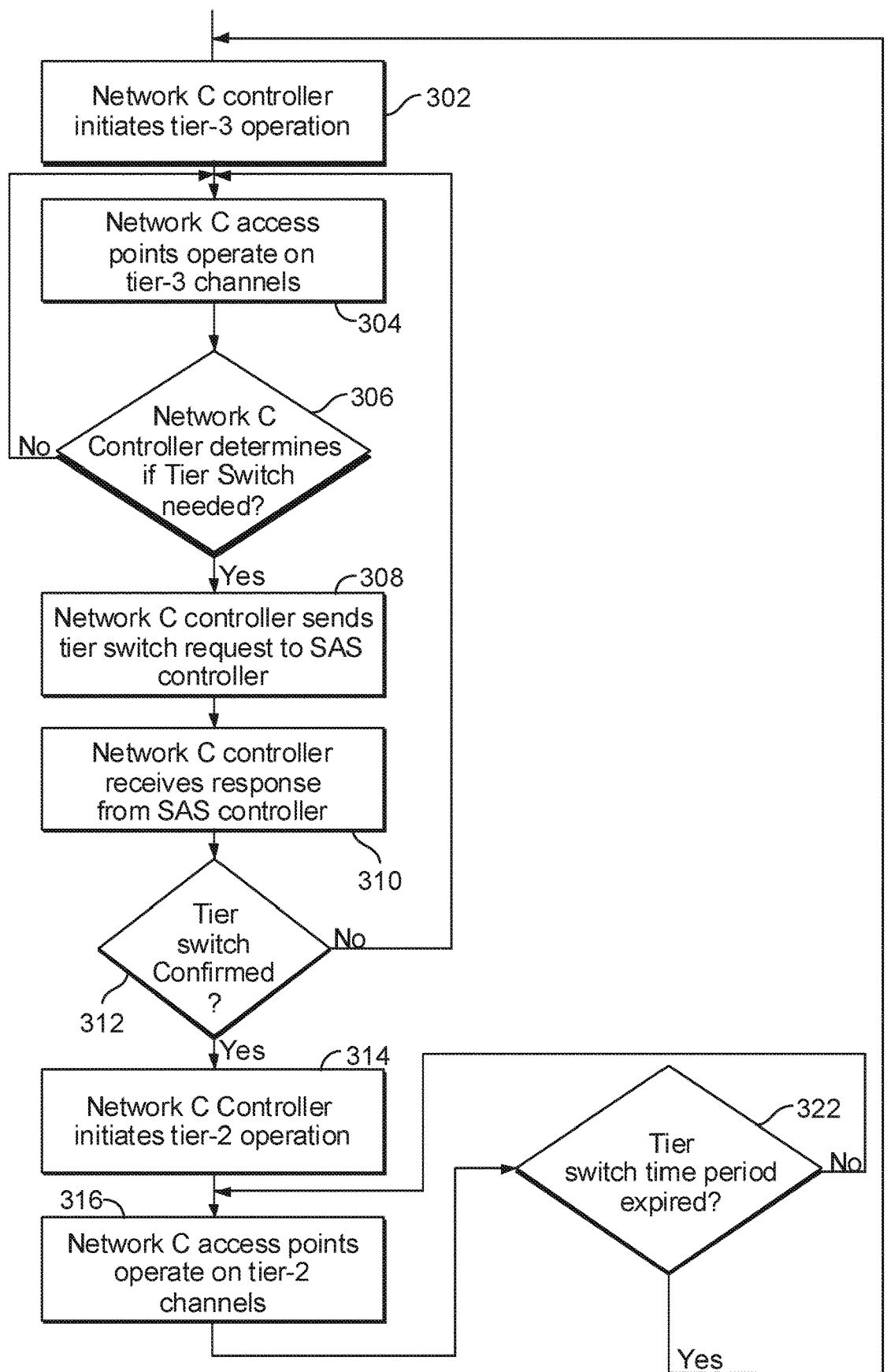
FIGS. 3A-3C illustrate operations performed during a tier switch between a first network and a second network in a spectrum access system.
Figure 3B:
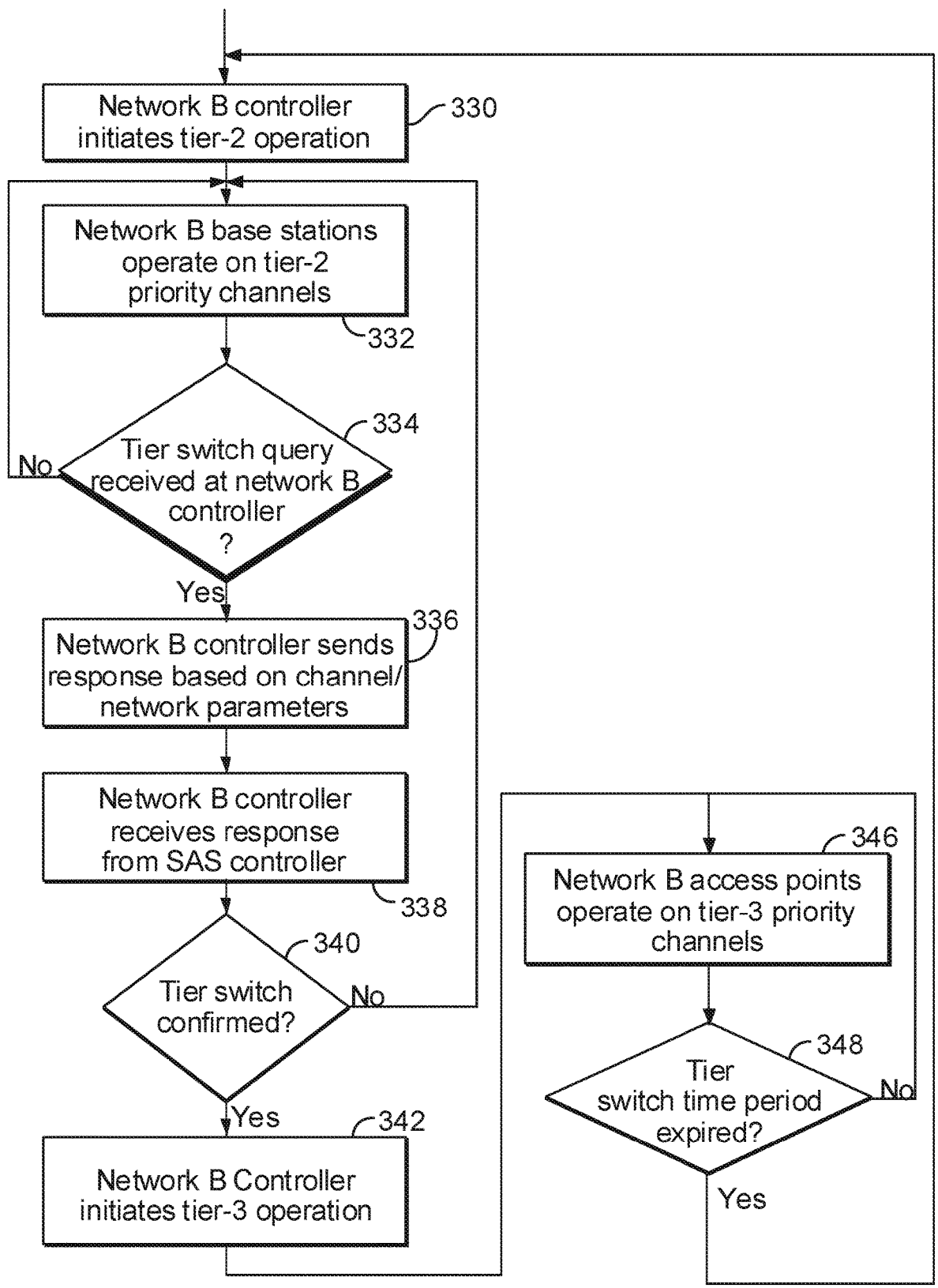
Figure 3C:
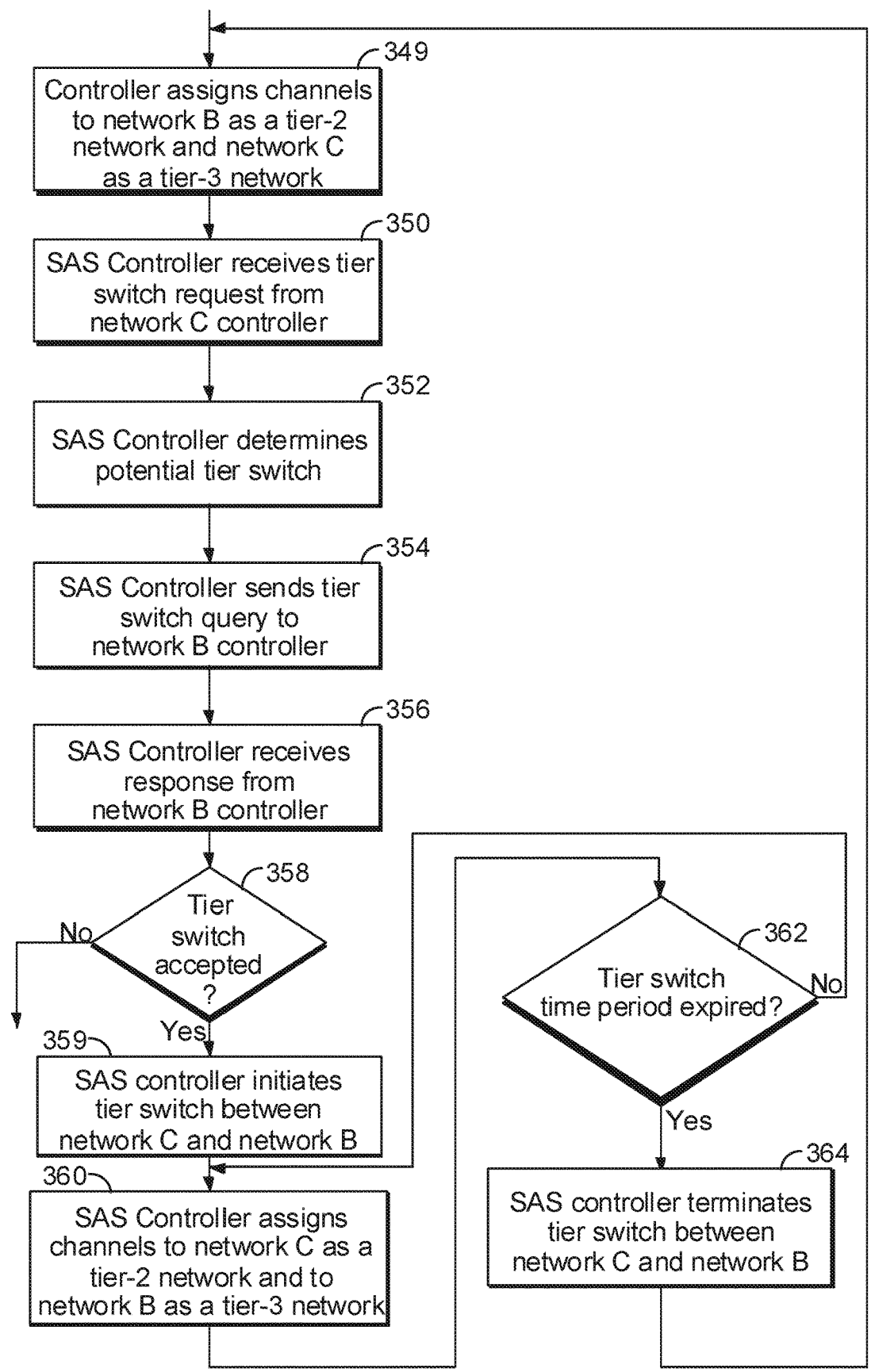

FIGS. 3A-3C illustrate example operations performed during a tier switch between a first network and a second network in a spectrum access system. FIGS. 3A-3C show an implementation of spectrum access system 100 in which network C controller 106 and a network B controller 102 communicate with SAS controller 104 of spectrum access system 100 to perform a tier level switch between network C and network B.

FIG. 3A illustrates example operations performed by network C controller 106 as network C controller 106 interacts with SAS controller 104 in spectrum access system 100 during a tier level switch between network C and network B.

The process begins at 302 where network C controller 106 initiates operation at the tier-3 level in spectrum access system 100. To initiate operation at the tier-3 level, processor 220 of network C controller 106 may send a database query to SAS controller 104 requesting a channel assignment as a tier-3 level network. Processor 220 of network C controller 106 may control channel assignment manager 218 to configure the database query and send the database query through network interface 219 over link 214 to SAS controller 104. Network C controller 106 then receives a query response from SAS controller 104 at network interface 219 on link 214 that includes a channel assignment identifying channels that SAS controller 104 has assigned to network C as a tier-3 level network. Channel assignment manager 218 processes the channel assignment and stores the identity of the assigned channels in a channel assignment database. Processor 220 then controls channel assignment manager 218 to communicate with access point 132 through access point interface 216 to allocate channels to access point 132.

At 304, access point 132 operates on one or more of the channels assigned to network C as a tier-3 level device. In the example of FIG. 3A, at least one uplink channel and at least one downlink channel may be assigned by network C controller 106 for communications between access point 132 and device 134. During the operation of network C, access point 132 and/or device 134 monitor channel parameters on the assigned channels on which access point 132 and device 134 communicate with one another. In monitoring the channel parameters, access point 132 may sample a signal on at least one channel from device 134 on the uplink and device 134 may sample a signal on at least one channel from access point 132 on the downlink. During the monitoring, access point 132 may generate N parameter samples ($S_1 \ldots S_N$) for each at least one channel on the uplink, and device 134 may generates N parameter samples ($S_1$, SN) for each at least one channel on the downlink. The samples may be normally uniform samples and the number of samples may be fixed. Access point 132 and/or device 134 may send the series of N parameter samples for the at least one channel to network C controller 106 at selected times. Network C controller 106 receives the N parameter samples at access point interface 216 on link 237 and the N parameter samples are provided to channel/network parameter monitor 222. In an implementation, the N parameter samples may comprise power level measurements of interference on the assigned channels. In other implementations, the N parameter samples may comprise any other type of measurements on the selected channel such as bit error rate/packet error rate, channel throughput, or other quality of services (QoS) related parameters.

At 306, as network C operates as a tier-3 level network, network C controller 106 determines if a tier switch is needed. The determination at 306 may be performed, for example, periodically. In an implementation, processor 220 may control channel/network parameter monitor 222 to determine a metric n using the N samples ($S_1, \ldots S_N$) that were received from access point 132 and/or device 134 by channel/network parameter monitor 222 during the channel monitoring time period. The metric n may comprise a power measurement determined from the N samples that indicates a level of interference as measured by access point 132 or device 134 on the uplink or downlink, respectively. The metric for the selected channel may be determined from the samples as the value n, where n is represented by:

$$n = \frac{1}{N}\sum_{i=1}^{N} |S_i|^2$$

To determine if a tier switch is needed processor 220 may determine if $n > n_{threshold}$ for the selected channel, where $n_{threshold}$ is set at a threshold level of interference that triggers a tier switch. In other implementations, the metric used to determine if a tier switch is needed may comprise any other type of metric that may be associated with quality of service in network C, such as bit error rate/packet error rate, channel throughput, network throughput or other quality of services (QoS) related parameters.

If, at 306, it is determined that a tier switch is not needed the process moves back to 304 and network C controller 106 continues to operate network C as a tier-3 network. If, at 306, is it determined that a tier switch is needed the process moves to 308.

At 308, network C controller 106 generates a tier switch request. The tier switch request may include information associated with a desired tier level into which network C requests to switch. The tier switch request may also include information associated with an amount of spectrum or range of frequencies that is to be included in the tier switch, and a time period for which the tier switch is requested to last. Processor 220 may generate the tier switch request and initiate sending of the tier switch request to SAS controller 104 over link 214 through network interface 219.

At 310, network C controller 106 receives a response to the tier switch request from SAS controller 104. Processor 220 may receive the response to the tier switch request from SAS controller 104 at network interface 219 over link 214. The response to the tier switch request may include an indication that SAS controller 104 is able to perform the tier switch.

At 312, processor 220 determines if the response to the tier request confirms that the tier switch is to take place. If the response to the tier switch request indicates that SAS controller 104 accepts the tier switch request, the tier switch is confirmed and the process moves to 314. Alternatively, at 312, if the response to the tier switch request indicates SAS controller 104 rejects the tier switch request, the tier switch is not confirmed and the process moves back to 304. At 304, network C controller 106 continues to operate network C as a tier-3 network.

At 314, network C controller 106 initiates tier-2 level operation. Processor 220 of network C controller 106 may send a database query to SAS controller 104 requesting a channel assignment as a tier-2 network. Processor 220 of network C controller 106 may control channel assignment manager 218 to configure the database query and send the database query through network interface 219 over link 214 to SAS controller 104. Network C controller 106 then receives a query response at network interface 219 on link 214 that includes a channel assignment identifying at least one channel that SAS controller 104 has assigned to network C as a tier-2 level network. Channel assignment manager 218 processes the channel assignment and stores the identity of the assigned channels in a channel assignment database. Processor 220 then controls channel assignment manager 218 to communicate with access point 132 to allocate channels for use by access point 132. At 314, processor 220 may also set tier switch timer 224 to run for the time period of the tier switch.

At 316, access point 132 then operates on one or more of the channels assigned to network C as a tier-2 level device in the tier switch. At 322, as network C operates as a tier-2 network, network C controller monitors tier switch timer 224 to determine if the tier switch time period is expired. If the tier switch timer 224 is not expired, processor 220 continues to control network C controller to operate as a tier-2 network at 316. If the tier switch timer 224 is expired, the process moves to 302 where processor 220 terminates operation at the tier-2 level and initiates operation at the tier-3 level for network C in spectrum access system 100.

FIG. 3B illustrates example operation performed by network B controller 102 as network B controller 102 interacts with SAS controller 104 in spectrum access system 100 as a tier level switch between network C and network B is performed. In an implementation, the process of FIG. 3B may be performed concurrently with the performance of the process of FIG. 3A by network C controller 106.

The process begins at 330 where network B controller 102 initiates operation at the tier-2 level in spectrum access system 100. To initiate operation at the tier-2 level, processor 206 of network controller 102 may initiate the sending of a database query to SAS controller 104 requesting a channel assignment as a tier-2 network. Processor 206 of network B controller 102 may control channel assignment manager 204 to configure the database query and send the database query through network interface 208 over link 214 to SAS controller 104. Network B controller 102 then receives a query response at network interface 208 on link 214 that includes a channel assignment identifying channels that SAS controller 104 has assigned to network B as a tier-2 level network. Channel assignment manager 204 processes the channel assignment and stores the identity of the assigned channels in a channel assignment database. Processor 206 then controls channel assignment manager 204 to communicate with base stations 122 and 126 to allocate channels for use by base stations 122 and 126.

At 332, base stations 122 and 126 operate on one or more of the channels assigned to network B as tier-2 level devices.

At 334, as network B operates as a tier-2 network, network B controller 102 determines if a tier switch query has been received from SAS controller 104. The determination at 334 may be performed by processor 206 monitoring communications received at network interface 208 on link 214 from SAS controller 104. If a tier switch query has not been received, the process returns to 332 and network B continues operation as a tier-2 network. If a tier switch query has been received the process moves to 336.

At 336, network B controller 102 initiates sending of a response to the tier switch query to SAS controller 104. In the example of FIG. 3B, the response may comprise an acceptance indicating to SAS controller 104 that network B controller 102 is able to accept the tier switch. Processor 206 may determine that network B is able to accept the tier switch based on information in the tier switch query that indicates the tier level and the amount of spectrum or range of frequencies that the network requesting the tier switch has requested, and the time period for which the tier switch is requested to last. Information provided by channel/network parameter monitor 210 may be considered in conjunction with the information in the tier switch query when making the determination. For example, processor 206 may determine that network B has spectrum which is unused and available in a large enough amount to allow it to accept the tier switch request. As part of determining if it may accept the tier switch, processing 206 may also determine that interference conditions in network B on tier-2 and/or tier-3 channels are at a low level and Network B devices could operate on tier-3 channels without degradation. In one implementation, channel/network parameter monitor 210 may monitor a parameter x during tier-2 operation in a process similar to the monitoring performed by network C controller 106 when the parameter n is determined at operations 304 and 306 of FIG. 3A. The monitoring of the parameter x may be performed on tier-3 and/or tier-2 channel frequencies. When interference conditions as indicated by the parameter x in network B are good and network B has available spectrum, network B may accept the tier switch.

At 338, network B controller 102 determines if a confirmation to the response comprising the acceptance of the tier switch is received from SAS controller 104. If a confirmation is not received, the process returns to 332 and network B continues to operate as a tier-2 network. If a confirmation is received, the process moves to 342.

At 342, network B controller 102 initiates operation as a tier-3 network. The initiation of operation network B as a tier-3 network at 342 may be performed similar to the initiation of the operation as a tier-2 network at 330 with the exception that network B controller 102 sends a database query to SAS controller 104 as a tier-3 network and network B is assigned channels as a tier-3 network. At 342, processor 206 may also set tier switch timer 212 to run for the time period of the tier switch. At 346, base stations 122 and 126 operate on one or more of the channels assigned to network B as a tier-3 level network.

At 348, as network B operates as a tier-3 network, network B controller 102 determines if the tier switch time period has expired. Processor 206 determines if the tier switch period has expired by monitoring tier switch timer 212. If the tier switch period is not expired, processor 206 continues to control network B controller to operate as a tier-3 network at 346. If the tier switch period is expired, the process moves to 330 where processor 206 terminates operation at the tier-3 level and initiates operation at the tier-2 level in spectrum access system 100.

FIG. 3C illustrates example operation performed by SAS controller 104 as SAS controller 104 interacts with network B controller 102 and network C controller 106 in spectrum access system 100 as a tier level switch between network C and network B is performed. In an implementation, the process of FIG. 3C may be performed concurrently with the performance of the processes of FIG. 3A and FIG. 3B by network C controller 106 and network B controller 102, respectively.

The process of FIG. 3C begins at 349 where SAS controller assigns channels to network B as a tier-2 level network and to network C as a tier-3 level network. During operation at 349, processor 234 may receive database queries from network B controller 102 and network C controller 106 at network interface 228 over link 214. Processor 234 may then interact with network tier database 232 and channel assignment database 230 to assign channels from channel assignment database 230 to network B and network C. The channel assignments will be based on network C being assigned tier-3 level and network B being assigned tier-2 level in network tier database 232. The channel assignments may be stored in channel assignment database 230. Processor 214 then initiates the sending of the channel assignments to network B controller 102 and network C controller 106 over link 214 through network interface 228.

At 350, as network C and network B operate as tier-3 and tier-2 level networks, respectively. SAS controller 104 receives a tier switch request from network C controller 106 at network interface 228 on link 214. Processor 234 receives the tier switch request and interacts with tier switch manager/database 226 to initiate processing of the tier switch request. The tier switch request may include information associated with a desired tier level into which network C requests to switch. The tier switch request may also include information associated with an amount of spectrum or range of frequencies that is to be included in the tier switch, and a time period for which the tier switch is requested.

At 352, SAS controller 104 determines a potential tier switch that may be performed. Processor 234 may determine that network B is a candidate for a tier switch with network C based on the information in the tier switch request and information from tier switch manager/database 226. The information in tier switch manager/database 226 may include tier switch information that is associated with other networks in SAS system 100. For example, the information in tier switch manager/database 226 may include information that indicates that network B will accept tier switches with other networks. The information in tier switch manager/database 226 may also include information on what tier levels and spectrum/frequency ranges network B will switch to or from, and other information such as particular time periods during which network B will accept tier switches.

At 354, SAS controller 104 sends a tier switch query to network B controller 102. Processor 234 initiates the sending of the tier switch query through network interface 228 over link 214. The tier switch query may include the information associated with a desired tier level into which network C requests to switch. The tier switch query may also include the information associated with an amount of spectrum or range of frequencies that is to be included in the tier switch, and the time period for which the tier switch is requested.

At 356, SAS controller 104 receives a response from network B controller 102. Processor 234 receives the response from network interface 228 and, at 358, determines whether the response indicates that network B controller 102 has accepted the tier switch with network C. If the tier switch has been accepted the process moves to 359. If the tier switch has not been accepted the process ends.

At 359, SAS controller 104 initiates the tier switch between network C and network B. Processor 234 initiates the sending of a response to the tier switch request to network C controller 106 indicating that the tier switch is confirmed through network interface 228 over link 214. The response sent to network C controller may include confirmation of the desired tier level that network C requested. The response may also include confirmation of the amount of spectrum or range of frequencies that is to be included in the tier switch, and the time period for which the tier switch is requested. Processor 234 also may initiate the sending of a response to the tier switch acceptance received from network B controller 102 at 356 to confirm the tier switch through network interface 228 over link 214.

At 360, the tier switch is implemented as SAS controller 104 assigns channels to network B as a tier-3 level network and to network C as a tier-3 level network. In order to implement the operation of 360, processor 234 may interact with network tier database 232 and channel assignment database 230 to create temporary assignments of network C to the tier-2 level and network B to the tier-3 level. Then, during operation at 360, processor 234 may receive database queries from network B controller 102 and network C controller 106 at network interface 228 over link 214 and assign channels from channel assignment database 230 to network B and network C. The channel assignments will be based on network C being assigned tier-2 level and network B being assigned tier-3 level in network tier database 232. Processor 234 then initiates the sending of the channel assignments to network B controller 102 and network C controller 106 over link 214 through network interface 228. The channel assignments used at 360 may be stored in network tier database and channel assignment database 230 as temporary assignments that are valid for the time period of the tier switch.

At 362, as SAS controller 104 assigns channels to network B as a tier-3 level network and to network C as a tier-3 level network, SAS controller 104 determines if the tier switch time period is expired. Processor 234 may monitor a timer to perform the operation of 362. If the tier switch time period is not expired, processor 234 controls SAS controller 104 to continue to assign channels to network B as a tier-3 level network and to network C as a tier-3 level network. If the tier switch period is expired, the process moves to 364.

At 364, SAS controller 104 terminates the tier switch between network B and network C. Processor 234 may interact with network tier database 232 to change the temporary assignment of tier-2 to network C back to an assignment of tier-3 to network C, and change the temporary assignment of tier-3 to network B back to an assignment of tier-2 to network B. the process then moves to 349 where SAS controller assigns channels to network B as a tier-2 level network and to network C as a tier-3 level network.

In other examples of the process shown in FIGS. 3A-3C, the tier switching may take place between networks operating at any of the tier levels of spectrum access system 100. For example, depending on the situation, a network may request a tier switch to a lower priority level, for example from tier-2 level to tier-3 level. In another example, a first network operating at tier-2 or tier-3 level may request a tier switch with a second network operating at tier-1 level. In this case, the first network would operate as a tier-1 level network in tier-1 level spectrum after the tier switch and would not need to receive channel assignments from the SAS controller, while the second network would operate as a tier-2 or tier-3 level network and need to receive channel assignments during the period of the tier switch.

In other implementations, a network may switch the tier level that it operates in by self-initiating a tier switch. In this case, the network may not switch tier levels with another network, but switch its own tier level independently of the tier levels that other networks in the spectrum access system use. The switching of tier levels may incur a cost or credit to the network depending on the tier level switched into. For example, if the network switches to a higher priority tier level, a cost may be incurred by the network and, if the network switches to a lower priority tier level, a credit may be given to the network. In an implementation, SAS controller 104 may include functions for maintaining accounting for tier switches of networks within spectrum access system 100 in network subscription database 236.

Figure 4:
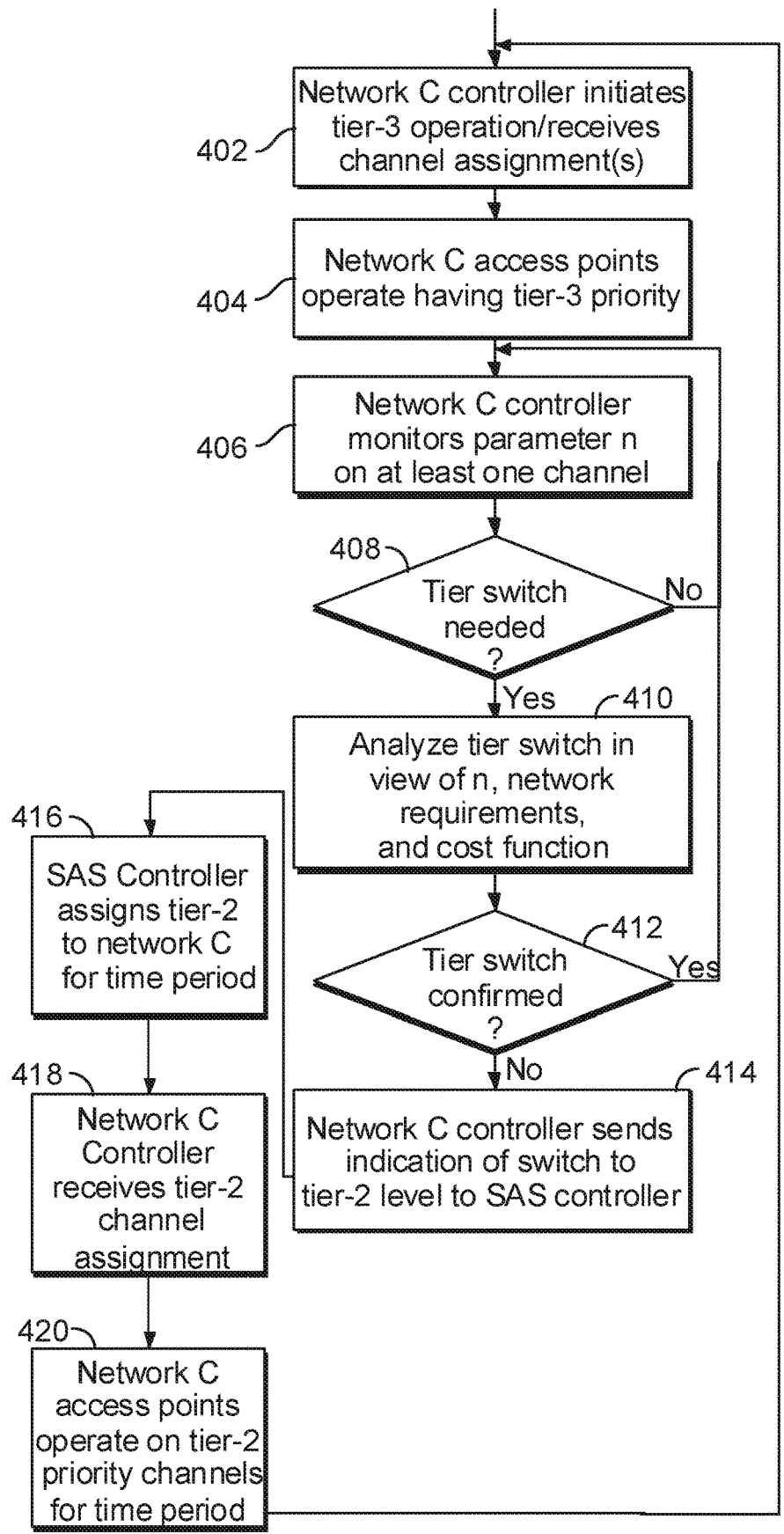
FIG. 4 is a flow diagram illustrating operations performed by an example network controller when switching network tier levels in a spectrum access system.

FIG. 4 is a flow diagram illustrating operations performed by an example network controller when switching network tier levels in a spectrum access system. FIG. 4 may be explained using network C controller 106 of FIGS. 1 and 2A as the controller of FIG. 4.

The process begins at 402 where network C controller 106 initiates operation at the tier-3 level in spectrum access system 100. To initiate operation at the tier-3 level, processor 220 of network C controller 106 may send a database query to SAS controller 104 requesting a channel assignment as a tier-3 network. Processor 220 of network C controller 106 may control channel assignment manager 218 to configure the database query and send the database query through network interface 219 over link 214 to SAS controller 104. Network C controller 106 then receives a query response at network interface 219 on link 214 that includes a channel assignment identifying at least one channel that SAS controller 104 has assigned to network C as a tier-3 level network. Channel assignment manager 218 processes the channel assignment and stores the identity of the assigned channels in a channel assignment database. Processor 220 then controls channel assignment manager 218 to communicate with access point 132 through access point interface 216 to allocate channels to access point 132.

At 404, access point 132 operates on one or more of the channels assigned to network C as a tier-3 level network. In the example of FIG. 4, at least one uplink channel and at least one downlink channel may be assigned by network C controller 106 for communications between access point 132 and device 134.

At 406, during the operation of network C, access point 132 and/or device 134 monitor channel parameters on the assigned channels on which access point 132 and device 134 communicate with one another. In monitoring the channel parameters, access point 132 may sample a signal on at least one channel from device 134 on the uplink, and device 134 may sample a signal on at least one channel from access point 132 on the downlink. During the monitoring, access point 132 may generate N parameter samples (S1 . . . SN) for each at least one channel on the uplink, and device 134 may generates N parameter samples (S1 . . . SN) for each at least channel on the downlink. The samples may be normally uniform samples and the number of samples may be fixed. Access point 132 and/or device 134 may send the series of N parameter samples for the at least one channel to network C controller at selected times. Network C controller 106 receives the N parameter samples at access point interface 216 on link 237 and the N parameter samples are provided to channel/network parameter monitor 222. In an implementation, the N parameter samples may comprise power level measurements of interference on the assigned channels. In other implementations, the N parameter samples may comprise any other type of measurements such as bit error rate/packet error rate, channel throughput, or other quality of services (QoS) related parameters. In further implementations, the N parameter samples may comprise network parameters such as throughput measurements.

At 408, as network C operates as a tier-3 network, network C controller 106 determines if a tier switch is needed. The determination at 408 may be performed, for example, periodically. Processor 220 controls channel/network parameter monitor 222 to determine a metric n using the N samples (S1, . . . SN) for the selected channel that were received by channel/network parameter monitor 222 during the channel monitoring time period. In an implementation, the metric n may comprise a power measurement determined from the N samples that indicates a level of interference on the selected channel as measured by access point 132 or device 134 on the uplink or downlink, respectively. The metric for the selected channel may be determined from the samples as a value n, where n is represented by $$n = \frac{1}{N}\sum_{i=1}^{N}|S_i|^2$$

To determine if a tier switch is needed processor 220 may determine if $n > n_{threshold}$ for the selected channel, where $n_{threshold}$ is set at a threshold level of interference.

In other implementations, the metric used to determine if a tier switch is needed may comprise any other type of metric that may be associated with quality of service in network C, such as bit error rate/packet error rate, channel throughput, network throughput or other quality of services (QoS) related parameters.

If, at 408, it is determined that a tier switch is not needed the process moves back to 404 and 406 where network C controller 106 continues to operate network C as a tier-3 level network. Network C controller 106 will also continue to monitor parameters on the assigned channels. If, at 408, is it determined that a tier switch is needed the process moves to 410.

At 410, processor 220 analyzes the tier switch in view of factors including the value of n, network/device requirements, and a cost function. In the operation of 410, processor 220 analyzes whether the benefits of making a switch from the tier-3 level to the tier-2 level outweigh the cost as defined by the cost function. The cost function may be a function provided by the spectrum access network and stored network C controller 106. For example, SAS controller 104 may send an updated cost function to network controllers in spectrum access system periodically. SAS controller 104 may also send an updated cost function to the network controllers as conditions change in spectrum access system 100. The cost function may define a cost to the operators and/or users of network C that will be incurred if a tier switch to the tier-2 level is made based on conditions of the tier switch. For example, the cost function may define the cost of a tier switch to tier-2 based on a time of time of day that the tier switch takes place and the duration of the tier switch. Processor 220 may also include information/data on various thresholds defined for network C when determining whether a tier switch should be performed. For example, a higher level of cost for a tier switch may be accepted for higher levels of interference as indicated by the value of the parameter n. In another example, a higher level of cost for a tier switch may be accepted for a given level of interference, as indicated by the parameter n, when higher than normal quality level transmissions, for example high quality video transmissions, are required in network C.

At 412, processor 220 determines if the tier switch is confirmed based on the analysis of operation 410. If the analysis determines that the cost of the tier switch is not acceptable, the process moves back to 404 where network C continues to operate as a tier-3 network. If the analysis determines that the cost of the tier switch is acceptable, the tier switch is confirmed and the process moves to 414.

At 414, network C controller 106 sends an indication of the tier switch of network C to tier-2 to SAS controller 104. The indication may include a database query requesting channel assignments for network C as a tier-2 network. Processor 220 of network C controller 102 may control channel assignment manager 204 to configure the database query and send the database query through network interface 219 over link 214 to SAS controller 104.

At 416, SAS controller 104 assigns channels to network C as a tier-2 level network. In order to implement the operation of 416, processor 234 of SAS controller 104 may interact with network tier database 232 and channel assignment database 230 to create a temporary assignment of network C to the tier-2 level. During operation at 360, processor 234 may receive database query from network C controller 106 at network interface 228 over link 214 and assign channels from channel assignment database 230 to network C. The channel assignments will be based on network C being assigned tier-2 in network tier database 232. Processor 214 then initiates the sending of the channel assignments to network C controller 106 over link 214 through network interface 228. The channel assignments may be stored in network tier database 232 and channel assignment database 230 as temporary assignments that are valid for the time period of the tier switch.

At 418, Network C controller 106 receives a response to the indication of the tier switch at network interface 219 on link 214. The response includes a channel assignment identifying at least one channel that SAS controller 104 has assigned to network C as a tier-2 level network. Channel assignment manager 218 processes the channel assignment and stores the identity of the assigned channels in a channel assignment database. Processor 220 then controls channel assignment manager 218 to communicate with access point 132 through access point interface 216 over link 237 to allocate channels for use by access point 132.

At 420, access point 132 then operates on one or more of the channels assigned to network C as a tier-2 level device in the tier switch. As network C operates as a tier-2 network, processor 220 of network C controller 106 may monitor switch timer 212 to determine if the tier switch period has expired. When the tier switch period expires, the process moves back to 402 where network C controller 106 terminates operation at the tier-2 level and initiates operation of network C at the tier-3 level in spectrum access system 100.

Figures 5A, 5B:
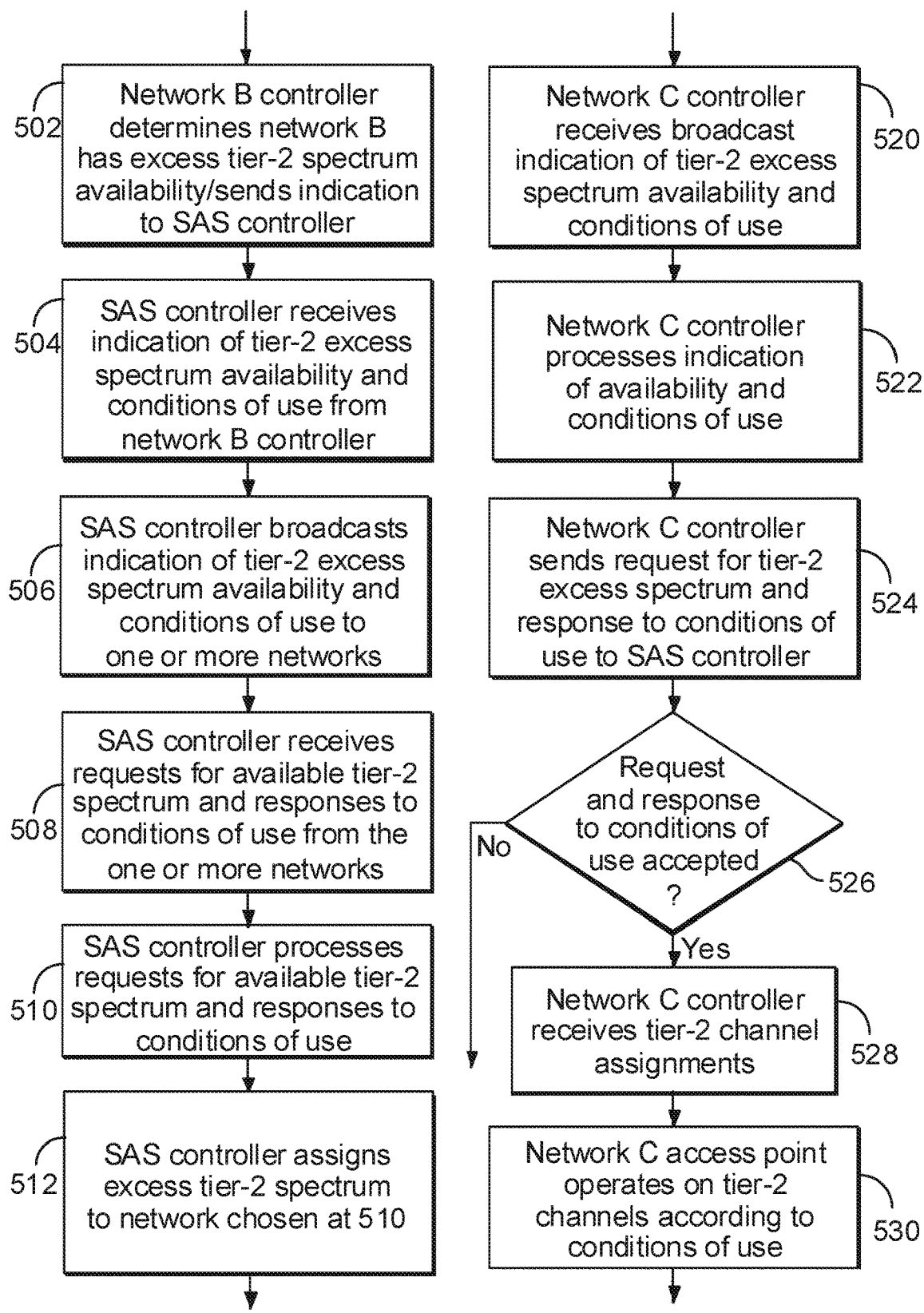
FIG. 5A is a flow diagram illustrating operations performed by an example spectrum access system controller when switching tier levels to utilize available spectrum in a spectrum access system.
FIG. 5B is a flow diagram illustrating operations performed by an example network controller when switching tier levels to utilize available spectrum in a spectrum access system.

FIGS. 5A and 5B illustrate operations of a process in which tier switching may be performed to allow spectrum of a spectrum access system to be utilized when the spectrum would be otherwise unutilized and/or unavailable for use. FIGS. 5A and 5B show an implementation of spectrum access system 100 in which network B controller 102 and network C controller 106 communicate with SAS controller 104 of spectrum access system 100 to perform a tier switch for network C that allows network C to utilize spectrum that is unutilized in network B.

FIG. 5A is a flow diagram illustrating operations performed by an example system controller when switching tier levels to utilize available spectrum in a spectrum access system. FIG. 5A may be explained using SAS controller 104 and network B controller 102 of FIGS. 1 and 2A as the network B controller and SAS controller, respectively, of FIG. 5A.

The process begins at 502 where network B controller 102 determines that network B has excess spectrum available at the tier-2 level and sends an indication of the availability to SAS controller 104. For example, network B controller 102 may determine that network B has been assigned tier-2 level channels that are not being utilized by network B devices and send an indication of this to SAS controller 104. The determination at 502 may be made on a time period basis. For example, the determination at 502 may be a determination that the spectrum is underutilized during a certain time of day. Processor 206 may make the determination by monitoring the use of channels assigned to network B by SAS controller 104 and stored in channel assignment database. When the number of unused channels as indicated by channel assignment manager 204 is above a designated amount, the spectrum comprising the channel may be considered underutilized. For example, processor 206 may determine that the number of unused channels indicated by channel assignment manager 204 is above the designated amount each day between the times of 1 am and 4 am. In this case, processor 206 may make a determination that it has excess spectrum tier-2 level available between 1 am and 4 pm each day and send an indication of this availability to SAS controller 104 through network interface 208 over link 214. In other examples, the determination may also be made on a current basis, where the determination is a determination that spectrum is presently being underutilized. This determination may include a determination that the underutilization has continued for the duration of a certain time period and is likely to continue. In this case, processor 206 may make a determination that it has excess spectrum tier-2 level that is presently available and will be available for some time period into the future, and send an indication of this availability to SAS controller 104 through network interface 208 over link 214. The indication of availability sent to SAS controller 104 at 502 may also include conditions of use. For example, the conditions of use may include a cost condition indicating that network B will grant the tier switch to a network responding with a highest bid for the available spectrum. In this case network B will switch the available spectrum with the network responding with a highest proposed payment or bid to be credited to network B for use of the tier-2 level spectrum as compared to proposed payments received from other networks. In another example, the selected network may meet the cost condition by agreeing to payment of a set cost that is indicated in the cost condition. Upon a switch being made, the payment may be credited by the SAS controller 104 to an account associated with the network B. The conditions of use may also define the time period during which the available spectrum may be used and information on the frequency band and/or channels comprising the spectrum.

At 504, SAS controller 104 receives the indication of tier-2 excess spectrum availability and conditions of use from network B controller 102. Processor 234 may receive the indication of tier-2 level spectrum availability and conditions of use though network interface 228 over link 214. Processor 234 of SAS controller 104 may process the indication of the available spectrum and conditions of use of the spectrum along with information in network subscription database 236 to determine one or more other networks of spectrum access system 100 that may utilize the available spectrum. For example, the information in network subscription database used in the determination may include information as to whether particular networks at particular tier levels should receive indications of available spectrum at the tier-2 level.

At 506, SAS controller 104 broadcasts an indication of the available tier-2 level spectrum and conditions of use of the spectrum to the one or more other networks in spectrum access system 100 as determined at 504. Processor 234 may initiate the broadcast of the indication of the available tier-2 level spectrum and conditions of use of the spectrum though network interface 228 on link 214 to the controllers of the one or more other networks. For example, the controllers of the one or more other networks may include network C controller 106 and the controllers of other networks of spectrum access system 100 not shown in FIG. 1.

At 508, SAS controller 104 receives requests for the available tier-2 level spectrum and responses to conditions of use from the one or more other networks. Processor 234 may receive the requests for the available tier-2 level spectrum and responses to conditions of use over link 214 at network interface 228.

At 510, SAS controller 104 processes the requests for the available tier-2 level spectrum and responses to the conditions of use. In an implementation in which the conditions of use include the payment of a set cost, processor 234 may process the requests for the available tier-2 level spectrum and responses to the conditions of use by determining the networks associated with the responses indicating that the conditions of use are acceptable. If only one network is associated with a response indicating that the conditions of use are acceptable, that network is chosen for the tier switch. If more than one network is associated with a response indicating that the conditions of use are acceptable, processor 234 may chose a network for the tier switch based on a priority. For example, network subscription database 236 may store a priority for each network of spectrum access system 100 that defines each network's priority relative to other networks for access to available excess spectrum. In an implementation in which the conditions of use include offering the highest bid for the available spectrum, a network that offers the highest bid for use of the spectrum as compared to other networks to which the available spectrum is presented is chosen for the tier switch. If no requests for the available tier-2 level spectrum are received at 508 the broadcast may be repeated. Also, in an implementation in which the conditions of use include offering the highest bid/payment of use for the available spectrum and two or more networks have offered the same highest bid, the broadcast may be repeated to those two or more networks in order that the networks may send another bid/payment.

At 512, SAS controller 104 assigns the available tier-2 spectrum for network B to the network chosen in 510. In order to implement the operation of 512, processor 234 of SAS controller 104 may interact with network tier database 232 and channel assignment database 230 to create a temporary assignment of network C to the tier-2 level for the available spectrum and a temporary block of network B from use of the spectrum in the tier-2 level. Processor 214 then initiates the sending of the channel assignments to network C controller 106 over link 214 through network interface 228. The channel assignments used at 512 may be stored in network tier database and channel assignment database 230 as temporary assignments that are valid for the time period of the tier switch. Based on what the cost conditions were, processor 234 may also initiate a credit to an account associated with network B, and a corresponding debit to an account associated with network C, in network subscription database 236.

FIG. 5B is a flow diagram illustrating operations performed by an example network controller when switching tier levels to utilize available spectrum in a spectrum access system. FIG. 5B may be explained using SAS controller 104 and network C controller 106 of FIGS. 1 and 2A as the network C controller and SAS controller, respectively, of FIG. 5B. FIG. 5B shows how a network C controller would communicate with an SAS controller performing the process of FIG. 5A.

The process begins at 520 where network C controller 106 receives an indication of the available tier-2 level spectrum and conditions of use of the spectrum broadcast by SAS controller 104. Processor 220 may receive the indication of the available tier-2 level spectrum and conditions of use of the spectrum at network interface 219, and at 522, process the received indication and conditions of use. Processor 220 may process the indication of the available tier-2 spectrum and the conditions of use using a cost/benefits analysis to determine if network C may benefit from use of the available tier-2 spectrum subject to the conditions of use. For example, Processor 220 may determine that network C may benefit from having additional bandwidth during the time periods defined in the condition of use based on information stored in channel/network parameter monitor 222. Processor 220 may also determine that that cost indicated in the conditions of use is bearable given the extent of the need for additional bandwidth during those time periods defined in the conditions of use. In an implementation in which the conditions of use include offering the highest bid for the available spectrum, processor 220 may determine a bid offer based on the need during that time period. In the example of FIG. 5B, processor 220 may determine that network C may benefit from use of the available spectrum subject to the conditions of use and the process moves to 524. In an alternative scenario, if processor 220 had determined that network would not benefit from use of the additional spectrum subject to the conditions of use, processor 220 may end the process at 522.

At 524, network C controller 106 initiates the sending of a request for the tier-2 level spectrum and a response to the conditions of use to SAS controller 104. Processor 220 initiates the sending of the request on link 214 from network interface 219. The response to the condition of use may include an indication of acceptance of the conditions of use, for example acceptance of a set cost or a bid for use of the tier-2 level spectrum. Network C controller 106 may be one of a number of network controllers in spectrum access system 100 that have received the indication of the available tier-2 spectrum and the conditions of use, and are responding in a similar manner.

At 526, network C controller 106 determines if a request for the tier-2 level spectrum and a response to the conditions of use have been accepted by SAS controller 104. Processor 220 may receive a response to the request for the tier-2 level spectrum at network interface 219 on link 214 from SAS controller 104 that indicates whether SAS controller 104 has accepted the request of network C controller 106 for the available spectrum. If it determined that SAS controller 104 does not accept the request, the process ends. If it is determined that SAS controller accepts the request, the process moves to 528.

At 528, Network C controller 106 receives tier-2 channel assignments in the available tier-2 level spectrum from SAS controller 104. Processor 220 receives the channel assignments at network interface 219 on link 214 identifying at least one channel that SAS controller 104 has assigned to network C as a tier-2 level network. Channel assignment manager 218 processes the channel assignment and stores the identity of the assigned channels in a channel assignment database. Processor 220 then controls channel assignment manager 218 to communicate with access point 132 to allocate channels for use by access point 132.

The timing of when operation 528 takes place depends on the time periods defined in the conditions of use. For example, if the conditions for use defined a particular time period of the day or week, network C controller 106 would receive tier-2 channel assignments for use at that time period.

At 530, access point 132 then operates on one or more of the channels assigned at 528 to network C as a tier-2 level device in the spectrum switched to network C from another network. As network C operates as a tier-2 network, processor 220 of network C controller 106 may monitor a timer to determine if the time period for the tier switch according to the conditions of use has expired. When the tier switch time period expires, the process moves back to 402 where network C controller 106 terminates operation at the tier-2 level and initiates operation at the tier-3 level in spectrum access system 100.

Figure 6A:
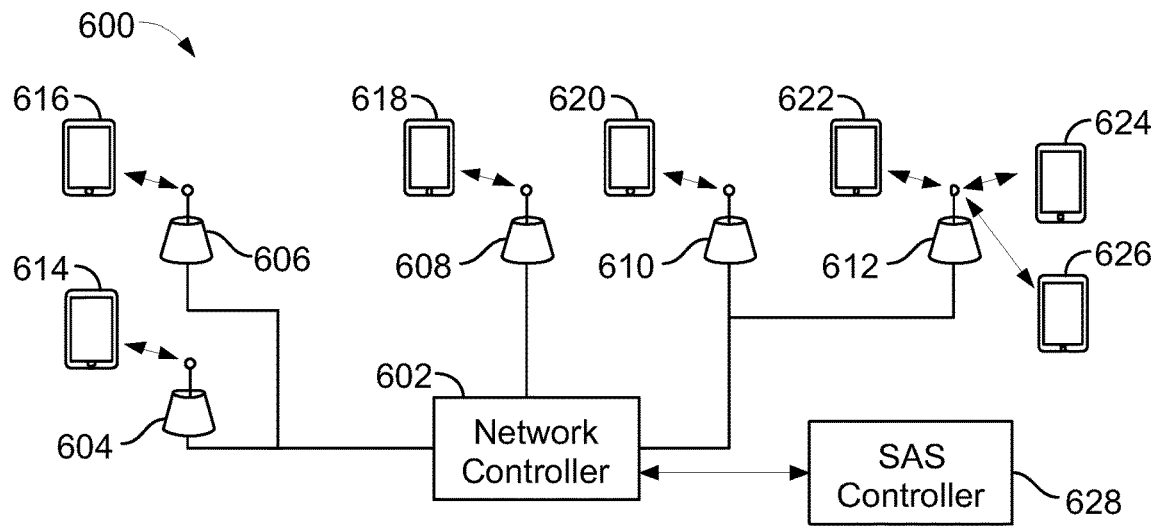
FIG. 6A is a diagram illustrating an example network having devices configured to switch between spectrum access system tier levels within the network.

FIG. 6A is a diagram illustrating an example network having devices configured to switch between tier levels within the network in a spectrum access system. FIG. 6A shows network 800 that includes network controller 602, access points 604, 606, 608, 610, and 612, and devices 614, 616, 618, 620, 622, 624, and 626. Network 800 may be business/organizational local area network (LAN) and access points 604-612 may be access points that operate according to one or more Wi-Fi standards. Devices 614-626 may be any type of device that has capability to communicate with one or more of access points 604-612 using channels implemented according to the appropriate W-Fi standard. Network 600 may be one network that is part of a larger spectrum access system that includes SAS controller 628.

In the implementation of FIG. 6A, SAS controller 628 may assign at least a first tier level and/or a second tier level of priority to networks, including network 800, operating in the spectrum access system. Network controller 602 may assign either the first and/or the second tier level to each of the access points 604-612 operating in network 600.

For example, network controller 602 may receive an assignment of at least one first channel from the SAS controller 628 and assign the at least one first channel to access points 604 and 606 based on access points 604 and 606 being assigned the first tier level by network controller 602. Network controller 602 may also receive an assignment of at least one second channel from SAS controller 628 and assign the at least one second channel to access points 608, 610, and 612 based on access points 608, 610, and 612 being assigned the second tier level by network controller 602. In an implementation, the priority of the second tier level may be higher than the priority of the first tier level within the spectrum access system. For example, the first and second tier levels may be the tier-3 and tier-2 levels, respectively, of a 3-tier spectrum access system controlled by SAS control 628.

During operation of network 600, network controller 602 may determine that a tier switch between access points 604 and 606 and access points 610 and 612 is to take place, i.e., is triggered. Network controller 602 may initiate the tier switch by assigning access points 604 and 606 to the second tier level and access points 610 and 612 to the first tier level, and assign the at least one second channel to access point 604 and 605 and the at least one first channel to access points 610 and 612. In one example scenario, the controller may determine that the tier switch between access points 604 and 606 and access points 610 and 612 is to take place by determining that the at least one first channel used by access points 604 and 606 is degraded and that, based on some network criteria, access points 604 and 606 should be given better quality channels than access points 610 and 612.

Figure 6B:
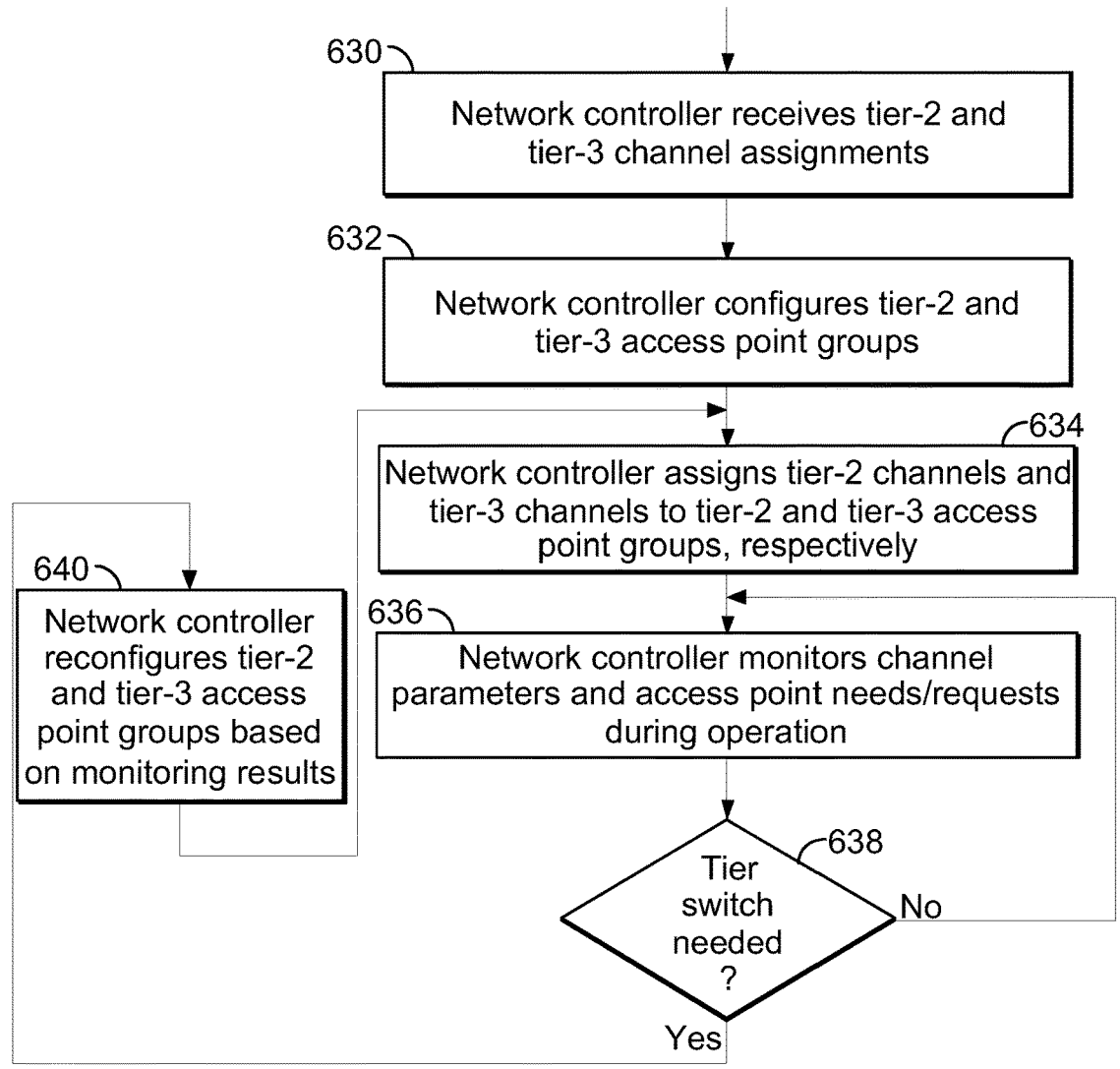
FIG. 6B is a flow diagram illustrating operations performed by an example network controller when switching devices between spectrum access system tier levels within a network.

FIG. 6B is a flow diagram illustrating operations performed by an example network controller when switching device tier levels within a network of a spectrum access system. FIG. 6B may be explained with reference to FIG. 6A using the example described above with SAS controller 628 being the controller of a 3-tier level spectrum access system that includes network 600 under its management.

The process begins at 630 where network controller 602 receives tier-2 level and tier-3 level channel assignments from SAS controller 628. The channels assignments may be received in response to one or more database queries sent to SAS controller 628 by network controller 602. The tier-2 level and tier-3 level channel assignments may assign a set of channels at the tier-2 level and a set of channels at the tier-3 level for use by network 600.

At 632, network controller 602 configures groups of access points within network 600 into tier-2 level and tier-3 level access point groups. Controller 600 may configure the groups based on the relative priority of communications carried by each of the access points 604-612. For example, controller 600 may determine access points 604 and 606 currently carry lower priority communications and configure access points 604 and 606 as a tier-3 level access point group. Controller 600 may also determine that access points 608, 610, and 612 currently carry higher priority communications and configure access point 608, 610, and 612 as a tier-2 level access point group. In an example scenario of this, access points 608, 610, and 612 may be installed in an executive meeting room where important meetings often take place, while access points 604 and 606 are installed in a secondary meeting room. Access points 608, 610, and 612 therefore merit a higher priority tier level.

At 634, network controller 602 assigns tier-2 channels to the tier-2 access point group comprising access points 608, 610, and 612 and tier-3 channels to the tier-3 access point group comprising access points 604 and 606.

At 636, during operation of network 600, network controller 602 monitors channel parameters and the traffic usage/load of access points 604-612. For example, network controller 602 may monitor interference levels, bit error rates, or other parameters related to channel quality of each of the channels used by the individual access points 604-612. Network controller 602 may receive results of measurements performed at devices 614-624 and access point 604-612 to perform the monitoring. Network controller 602 may also monitor throughput and traffic usage/load demands on each of the access points 604-612 during operation of network 600.

At 638, network controller 602 determines if a tier switch is triggered in network 600. If network controller 602 determines that a tier switch is not triggered, the process returns to 636 where controller 602 continues to monitor channel parameters and the traffic usage/load of access points 604-612. If network controller 602 determines that a tier switch is triggered, the process moves to 640.

The determination at 638 of whether a tier switch is triggered may be based on information from the monitoring performed at 434. For example, network controller 602 may determine that channel quality of the tier-3 channels assigned to the tier-3 access point group comprising access points 604 and 606 has degraded to below an acceptable level while the traffic usage/load demands of access points 604 and 606 have increased. At the same time controller 602 may determine that the traffic usage/load demands on the tier-2 channels assigned to the tier-2 access point group comprising access points 608, 610, and 612 have decreased and the tier-2 channels are underutilized. Based on the relative situations of each of the access points, network controller may determine that a tier switch should occur between the tier-3 access point group comprising access points 604 and 606 and the tier-2 access point group comprising access points 608, 610, and 612. In other words, the tier levels of the access point groups should be switched so that access points 604 and 606 may utilize the higher priority tier-2 level channels that are currently underutilized and assigned to access points 608, 610, and 612.

At 640, controller 602 reconfigures the tier-2 and tier-3 access point groups based on the monitoring results by reconfiguring access points 604 and 606 as a tier-2 level access point group and reconfiguring access points 608, 610, and 612 as a tier-2 level access point group. The process then moves back to 634. At 634, network controller 602 assigns tier-2 channels to the tier-2 access point group comprising access points 604 and 606 and tier-3 channels to the tier-3 access point group comprising access points 608, 610, and 612.

The tier switching achieved by the example process of FIG. 6B may be implemented using any type of access point group. For example, the access points may each be treated separately by treating each access point as an access point group with one member, and the tier switching may be performed between individual access points rather than groups of access points. Also, the tier switching may include moving individual access point between access point groups to switch the tier level of individual access points, rather than switching the tier levels of the all the access points of an access point group.

Figure 7:
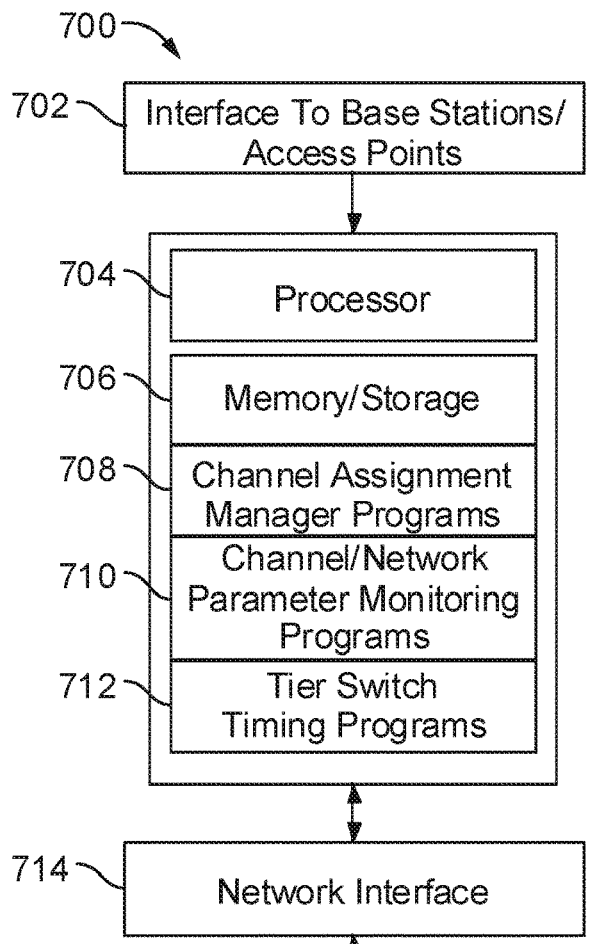
FIG. 7 is a simplified block diagram showing an example network controller; and, FIG. 8 is a simplified block diagram showing an example spectrum access system controller.

FIG. 7 is a simplified block diagram showing an example network controller 700 that may be implemented in a network in a spectrum access system. Network controller 700 represents an example implementation of network B controller 102 that was described in relation to FIGS. 1, 2B, and 3B. Network controller 700 may also represent an example implementation of network C controller 106 that was described in relation to FIGS. 1, 2A, and 3A.

Network controller 700 includes processor 704, network interface 714, interface to base stations/access points 702, and memory/storage 706. Memory/storage 706 includes code and program/instructions for channel assignment manager programs 708, channel/network parameter monitoring programs 710, and tier switch timing programs 712. Network controller 700 may connect though network interface 714 to a backend network that provides a connection to an SAS controller of a spectrum access system. Network interface 714 may be any type of interface, wireless or otherwise, to a backend network, for example the interne. Interface to base stations/access points 702 may be any type of interface, wireless or otherwise, that allows network controller 700 to communicate with base stations and/or access points such as base stations 122 and 126, and access point 132 of FIG. 1A.

Processor 704 may comprise one or more processors, or other control circuitry or any combination of processors and control circuitry that provide overall control of network controller 700 according to the disclosed embodiments. Memory 706 may be implemented as any type of as any type of computer readable storage media, including non-volatile and volatile memory.

In an implementation, execution of channel assignment manager programs 708, channel/network parameter monitoring programs 710, and tier switch timer 712 causes processor 704 to implement operations that cause network controller 700 to operate according to the operations described for network controllers 102 and 106 in relation to the implementations described in this disclosure.

Figure 8:
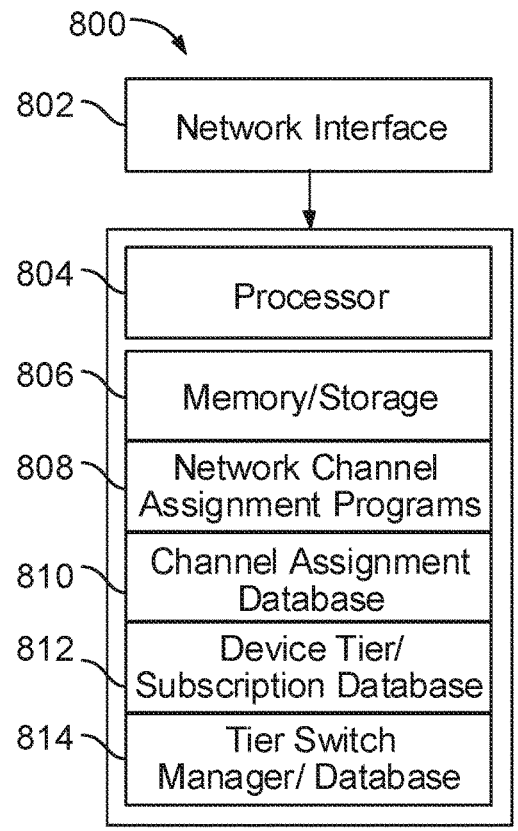

FIG. 8 is a simplified block diagram showing an SAS controller 800 that may be implemented in a spectrum access system. SAS controller 800 represents an example implementation of SAS controller 104 that was described in relation to FIGS. 1, 3C, 5A and 6B. Base station 800 includes processor 804, network interface 802, and memory/storage 806 that includes code and program/instructions for network channel assignment programs 808, channel assignment database 810, device tier/subscription database 812, and tier switch manager/database programs 814. SAS controller may connect to one or more network controllers, such as network controllers 102 and 105 of FIG. 1, through network interface 802. Network interface 802 may be any type of interface, wireless or otherwise, to a network, for example the internet. Processor 804 may comprise one or more processors, or other control circuitry or any combination of processors and control circuitry that provide overall control of SAS controller 800 according to the disclosed embodiments. Memory 806 may be implemented as any type of as any type of computer readable storage media, including non-volatile and volatile memory.

In an implementation, execution of network channel assignment programs 808 and tier switch manager/database programs 814, in conjunction with channel assignment database 810 and device tier/subscription database 812, causes processor 804 to implement operations that cause SAS controller 800 to operate according to the operations described for SAS controller 104 in relation to the implementations of this disclosure.

The example embodiments disclosed herein may be described in the general context of processor-executable code or instructions stored on memory that may comprise one or more computer readable storage media (e.g., tangible non-transitory computer-readable storage media such as memory 706 or 806). As should be readily understood, the terms "computer-readable storage media" or "non-transitory computer-readable media" include the media for storing of data, code and program instructions, such as memory 706 or 806, and do not include portions of the media for storing transitory propagated or modulated data communication multi-carrier signals.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuit, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

The disclosed implementations include a controller for controlling a first and a second network in a spectrum access system having a plurality of tier levels for spectrum access. The controller comprised one or more processors and memory in communication with the one or more processors. The memory comprises code that, when executed, causes the one or more processors to control the controller to assign one or more first channels to a first network based on the first network being assigned a first tier level of the plurality of tier levels, determine that a tier switch is to take place between the first network and a second network assigned a second tier level of the plurality of tier levels, initiate the tier switch between the first network and the second network, and, assign, in response to the determination that the tier switch is to take place, one or more second channels to the second network based on the second network being assigned the first tier level. The controller may further assign, in response to the determination that the tier switch is to take place, one or more third channels to the first network based on the first network being assigned the second tier level. The code may further cause the controller to receive a tier switch request from the first network and determine that the tier switch is to take place based on the tier switch request. The code may further causes the controller to receive a tier switch request from the first network, send a tier switch query to the second network based on the tier switch request, receive a response from the second network, and, determine that the tier switch is to take place based on the response from the second network. The controller may determine that the tier switch is to take place between the first network and the second network for the duration of a tier switch period, and assigns the one or more second channels to the second network for the duration of the tier switch period. The second tier level may be a tier-1 level of a three tier spectrum access system or the second tier level may be a tier-2 level of a three tier spectrum access system.

The disclosed implementations also include a controller for a network in a spectrum access system having a plurality of tier levels for spectrum access priority. The controller comprises one or more processors and memory in communication with the one or more processors. The memory comprises code that, when executed, causes the one or more processors to control the controller to receive an assignment of at least one first channel based on the network being assigned a first tier level of the plurality of tier levels by the spectrum access system, monitor a parameter of the network, determine that a switch to a second tier level of the plurality of tier levels is to take place based at least on the parameter, send an indication to the spectrum access system that the network is switching to the second tier level of the plurality of tier levels, and, initiate operation of the network on at least one second channel based on the network being assigned the second tier level of the plurality of tier levels by the spectrum access system. The controller may determine that the switch to the second tier level of the plurality of tier levels is to take place based at least on the parameter and a cost function. The controller determines that the tier switch to the second tier level is to take place for the duration of a time period, and control the network to operate on the at least one second channel based on the network having the second tier level during duration of the time period. The parameter may include a parameter on a selected channel of the at least one first channel.

The disclosed implementations also include a controller for controlling devices in a network within a spectrum access system having at least a first tier level and a second tier level of priority for spectrum access. The controller comprises one or more processors and memory in communication with the one or more processors. The memory comprises code that, when executed, causes the one or more processors to control the controller to receive an assignment of at least first channel from the spectrum access system and assign the at least one first channel to at least one first device based on the at least one first device being assigned the first tier level in the network, assign at least one second channel to at least one second device based on the at least one second device being assigned the second tier level in the network, determine that a tier switch between the at least one first device and the at least one second device is to take place, initiate a tier switch between the at least one first device and at least one second device, and, assign the at least one second channel to the at least one first device and the at least one first channel to the at least one second device. The controller may further receive an assignment of the at least one second channel from the spectrum access system. The second tier level may be a highest priority level of the spectrum access system. The priority of the first tier level may be lower than the priority of the second tier level, and the controller may determines that a tier switch between the at least one first device and the at least one second device is to take place by determining that the quality of the at least one first channel is degraded.

The disclosed implementations further include a controller for controlling a plurality of networks in a spectrum access system having at least first and second tier levels for spectrum access. The controller comprises one or more processors and memory in communication with the one or more processors. The memory comprises code that, when executed, causes the one or more processors to control the controller to receive information on first tier level spectrum available for use by one or more second networks from a first network, wherein the first network is operating at the first tier level, send the information on the first tier level spectrum to the one or more second networks, receive at least one response from the one or more second networks, process the at least one response, and, assign one or more channels of the first tier level spectrum to a selected network of the one or more second networks based on the at least one response. The information on the first tier level spectrum may include conditions of use for the first tier level spectrum. The conditions of use may include a cost condition and the at least one response may indicate that the selected network of the one or more second networks accepts the cost condition. The conditions of use may include responding with a highest proposed payment, and the at least one response may indicate that the selected network of the one or more second networks has responded with the highest proposed payment. The conditions of use may include a time period during which the first tier level spectrum is available.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may be combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A device connected to a network and configured to connect a wireless device to the network, comprising:
   a processor; and
   a computer-readable medium in communication with the processor, the computer-readable medium comprising executable instructions that, when executed by the processor, cause the processor to control the device to perform:
      establishing, via a first channel of a frequency spectrum available for the network, a first wireless connection with a first wireless device, wherein the first wireless device is associated with a first tier level which prohibits access to a second channel of the frequency spectrum unless authorized by a controller of the network, the second channel reserved for a second wireless device having a second tier level which permits access to the second channel of the frequency spectrum;
      determining, based on a channel quality of the first channel, that a channel switch condition is met, which requires switching from the first channel to the second channel of the frequency spectrum;
      in response to determining that the channel switch condition is met, sending, to the controller of the network, a request for channel switch from the first channel to the second channel of the frequency spectrum;
      receiving, from the controller of the network, an authorization for switching from the first channel to the second channel of the frequency spectrum; and
      in response to receiving the authorization from the controller of the network, establishing a second wireless connection with the first wireless device via the second channel of the frequency spectrum.

2. The device of claim 1, wherein the instructions, when executed by the processor, further cause the processor to control the device to perform receiving, from the controller of the network, an assignment of the first channel.

3. The device of claim 1, wherein, for determining that the channel switch condition is met, when executed by the processor, the instructions cause the processor to control the device to perform determining that a level of interference on the first channel meets a predetermined threshold value.

4. The device of claim 1, wherein, for determining that the channel switch condition is met, when executed by the processor, the instructions cause the processor to control the device to perform monitoring a parameter of the first channel.

5. The device of claim 4, wherein the parameter comprises a bit error rate parameter, a packet error rate parameter, a channel throughput parameter or a QoS parameter of the first channel.

6. The device of claim 1, wherein the instructions, when executed by the processor, further cause the processor to control the device to perform determining that a benefit of the channel switch from the first channel to the second channel outweighs a cost for the channel switch.

7. The device of claim 6, wherein the instructions, when executed by the processor, further cause the processor to control the device to perform receiving, from the controller of the network, a cost function defining the cost for the channel switch.

8. The device of claim 1, wherein, for determining that the channel switch condition is met, when executed by the processor, the instructions cause the processor to control the device to perform periodically determining whether the channel switch condition is met.

9. The device of claim 1, wherein the instructions, when executed by the processor, further cause the processor to control the device to perform:
   determining that a predetermined period for the channel switch has expired; and
   in response to determining that the predetermined period has expired, performing:
      terminating connecting the first wireless device to the network via the second channel of the frequency spectrum; and
      connecting the first wireless device to the network via a channel of the frequency spectrum associated with the first tier level.

10. A method of operating a device connected to a network and configured to connect a wireless device to the network, the method comprising:
    establishing, via a first channel of a frequency spectrum available for the network, a first wireless connection with a first wireless device, wherein the first wireless device is associated with a first tier level which prohibits access to a second channel of the frequency spectrum unless authorized by a controller of the network, the second channel reserved for a second wireless device having a second tier level which permits access to the second channel of the frequency spectrum;
    determining, based on a channel quality of the first channel, that a channel switch condition is met, which requires switching from the first channel to the second channel of the frequency spectrum;
    in response to determining that the channel switch condition is met, sending, to the controller of the network, a request for channel switch from the first channel to the second channel of the frequency spectrum;
    receiving, from the controller of the network, an authorization for switching from the first channel to the second channel of the frequency spectrum; and
    in response to receiving the authorization from the controller of the network, establishing a second wireless connection with the first wireless device via the second channel of the frequency spectrum.

11. The method of claim 10, wherein further comprises receiving, from the controller of the network, an assignment of the first channel.

12. The method of claim 10, wherein determining that the channel switch condition is met comprises determining that a level of interference on the first channel meets a predetermined threshold value.

13. The method of claim 10, wherein determining that the tier level channel switch condition is met comprises monitoring a parameter of the first channel.

14. The method of claim 13, wherein the parameter comprises a bit error rate parameter, a packet error rate parameter, a channel throughput parameter or a QoS parameter of the first channel.

15. The method of claim 10, further comprising determining that a benefit of the channel switch from the first channel to the second channel outweighs a cost for the channel switch.

16. The method of claim 15, further comprising receiving, from the controller of the network, a cost function defining the cost for the channel switch.

17. The method of claim 10, wherein determining that the channel switch condition is met comprises periodically determining whether the channel switch condition is met.

18. The method of claim 10, further comprising:
determining that a predetermined period for the channel switch has expired; and
in response to determining that the predetermined period has expired, performing:
terminating connecting the first wireless device to the network via the second channel of the frequency spectrum; and
connecting the first wireless device to the network via a channel of the frequency spectrum associated with the first tier level.

19. A non-transitory computer-readable medium storing executable instructions that, when executed by a processor, cause the processor to control a system to perform:
establishing, via a first channel of a frequency spectrum available for a network, a first wireless connection with a first wireless device, wherein the first wireless device is associated with a first tier level which prohibits access to a second channel of the frequency spectrum unless authorized by a controller of the network, the second channel reserved for a second wireless device having a second tier level which permits access to the second channel of the frequency spectrum;
determining, based on a channel quality of the first channel, that a channel switch condition is met, which requires switching from the first channel to the second channel of the frequency spectrum;
in response to determining that the channel switch condition is met, sending, to the controller of the network, a request for channel switch from the first channel to the second channel of the frequency spectrum;
receiving, from the controller of the network, an authorization for switching from the first channel to the second channel of the frequency spectrum; and
in response to receiving the authorization from the controller of the network, establishing a second wireless connection with the first wireless device via the second channel of the frequency spectrum.

20. The non-transitory computer-readable medium of claim 19, wherein, for determining that the channel switch condition is met, the instructions, when executed by the processor, further cause the processor to control the system to perform determining that a level of interference on the first channel meets a predetermined threshold value.

* * * * *